(12) United States Patent
Ganta et al.

(10) Patent No.: US 10,650,093 B2
(45) Date of Patent: May 12, 2020

(54) DATA STRUCTURE PROCESSING FOR ACTIONABLE NOTIFICATIONS

(71) Applicant: Oracle International Corporation, Redwood Shores, CA (US)

(72) Inventors: Suman Ganta, Fremont, CA (US); Nikhil Sabharwal, Foster City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 133 days.

(21) Appl. No.: 15/482,371

(22) Filed: Apr. 7, 2017

(65) Prior Publication Data

US 2018/0075008 A1 Mar. 15, 2018

Related U.S. Application Data

(60) Provisional application No. 62/395,290, filed on Sep. 15, 2016.

(51) Int. Cl.
*G06F 17/00* (2019.01)
*G06F 17/24* (2006.01)
(Continued)

(52) U.S. Cl.
CPC .......... *G06F 17/248* (2013.01); *G06F 17/214* (2013.01); *G06F 17/2235* (2013.01); *G06F 17/2243* (2013.01); *G06Q 10/103* (2013.01); *G06Q 10/107* (2013.01); *H04L 51/04* (2013.01); *H04L 67/10* (2013.01); *G06F 17/2247* (2013.01); *H04L 67/02* (2013.01)

(58) Field of Classification Search
CPC ....................... G06F 17/2235; G06F 17/30867

USPC .................................................. 715/205, 200
See application file for complete search history.

(56) References Cited

U.S. PATENT DOCUMENTS

| | | | |
|---|---|---|---|
| 8,495,611 B2 * | 7/2013 | McCarthy | G06F 9/5072 709/203 |
| 2007/0186214 A1 * | 8/2007 | Morgan | G06F 9/485 718/100 |

(Continued)

OTHER PUBLICATIONS

Adobe, AEM forms * Configuring task functionality, published May 8, 2017 via Wayback machine, pp. 1-9 (pdf).*

(Continued)

*Primary Examiner* — Manglesh M Patel
(74) *Attorney, Agent, or Firm* — Trellis IP Law Group, PC

(57) ABSTRACT

Various embodiments provide for a method for using data structures, such as templates, to create a customized email for tasks. Form data is received from a form of a user interface for an application. The form data pertains to a task and the form data includes an action to perform with respect to the task. A template that specifies a layout for the form data is accessed. A string with string data that includes the form data and the layout is generated. The customized email is generated based on the string. The customized email includes an action link that corresponds with the form's action to perform with respect to the task. Information pertaining to a user interaction with respect to the action link in the customized email is received. The user interaction was performed at the mobile client device. Status of the task is updated based on the user interaction with the action link.

18 Claims, 20 Drawing Sheets

(51) Int. Cl.
    *G06F 17/22*           (2006.01)
    *G06F 17/21*           (2006.01)
    *H04L 12/58*           (2006.01)
    *H04L 29/08*           (2006.01)
    *G06Q 10/10*          (2012.01)

(56) References Cited

U.S. PATENT DOCUMENTS

| | | | |
|---|---|---|---|
| 2014/0075130 A1* | 3/2014 | Bansal | G06F 17/30194 |
| | | | 711/153 |
| 2014/0082521 A1* | 3/2014 | Carolan | H04L 51/00 |
| | | | 715/752 |

OTHER PUBLICATIONS

Adobe, Adobe Experience Manager-forms, published 2016 by Adobe, pp. 1-6 (pdf).*

Adobe, Use Custom email templates in an Assign Task step, published 2018 by Adobe, pp. 1-6 (pdf).*

* cited by examiner

From: no-reply@oracle.com <no-reply@oracle.com>
Subject: Approved: New Hire Approval
To: nikhil.sabharwal@oracle.com ORACLE® Cloud

401

| APPROVE | HOLD | REJECT |

Hello weblogic
Task New Hire Approval requires your attention. View Online

Task Information

| From: | weblogic |
| Summary: | Go through the candidate profile to make a decision on hiring |
| Priority: | High |
| Created on: | 2016-09-07 at 11:54 |
| Due Date: | 2016-09-10 at 16:11:54 |

Data

Candidate information
Name:          Joe Doe
Department:    Computer Science

Education
University:    San Jose State University
Start Date:    2006-09-01T07:00:00Z
End Date:      2010-09-01T07:00:00Z Experience
Company:       None
Years:         0

Skills
Spoken Languages:    English
Technologies:        Java

402

Comments

Please consider this candidate
By-weblogic at 2016-09-07 at 15:12:15

DATA STRUCTURE PROCESSING FOR ACTIONABLE NOTIFICATIONS

CROSS REFERENCES TO RELATED APPLICATIONS

This application claims priority from U.S. Provisional Patent Application Ser. No. 62/395,290, entitled ACTIONABLE NOTIFICATIONS FOR HUMAN TASK APPROVAL, filed on Sep. 15, 2016 (ORACP0185P, which was hereby incorporated by reference as if set forth in full in this application for all purposes This application is related to the following application, U.S. Provisional Application Ser. No. 62/395,341, entitled SYSTEM FOR PROCESS CLOUD SERVICE, filed on Sep. 15, 2016 (Trellis ref ORACP0192P/Client ref. ORA170390-US-PSP), which is hereby incorporated by reference as if set forth in full in this application for all purposes.

BACKGROUND

Workflow coordination involves coordinating activities between many entities working on a task. The entities work on the task at different points in time and possibly in a specified sequence. There is a need for improved and more flexible methods of coordination and communication between the entities.

SUMMARY

A further understanding of the nature and the advantages of particular embodiments disclosed herein may be realized by reference of the remaining portions of the specification and the attached drawings.

Various embodiments provide for a method for using data structures, such as templates, to create a customized email for tasks. Form data is received from a form of a user interface for an application. The form data pertains to a task. The form data includes an action to perform with respect to the task. A template that specifies a layout for the form data is accessed. A string is generated with string data that includes the form data and the layout. The string data describes itself. A customized email is generated based on the string. The customized email includes an action link that corresponds with the form's action to perform with respect to the task. The customized email is transmitted from a process cloud services (PCS) server to a mobile client device. The PCS server receives information pertaining to a user interaction, performed on the mobile client device, with respect to the action link in the customized email. The status of the task is updated based on the user interaction with the action link.

An embodiment provides a method for creating a customized email for a task, the method providing; receiving form data from a form of a user interface for an application, wherein the form data pertains to a task and the form data includes an action to perform with respect to the task; accessing a template that specifies a layout for the form data; generating a string with string data that includes the form data and the layout, wherein the string data describes itself; generating the customized email based on the string, wherein the customized email includes an action link that corresponds with the form's action to perform with respect to the task; transmitting the customized email from a process cloud services (PCS) server to a mobile client device; receiving, at the process cloud services (PCS) server, information pertaining to a user interaction with respect to the action link in the customized email, wherein the user interaction was performed at the mobile client device; and updating status of the task based on the user interaction with the action link.

BRIEF DESCRIPTION OF THE DRAWINGS

FIG. 4 depicts a customized email that was generated based on the form depicted in FIG. 3, according to one embodiment.

DETAILED DESCRIPTION OF EMBODIMENTS

Overview of the Discussion

Although various embodiments are described in the context of a human task, embodiments are well suited for non-human tasks. For example, actionable notifications could be for non-human tasks and the actions taken with respect to these notifications can be used to coordinate with and between non-human tasks for entities, such as software, hardware, machines, and so on. The actions may be taken by humans or non-human entities. For example, software, hardware machines, and so on may automatically take an action without human intervention.

When a human is working on a task or a process that includes many tasks, such as a software development process or a hiring process, the human coordinates the task(s) with other people. For example, referring to FIG. 1A, assuming that the task is for hiring a new employee, the user logs into an application 111A that the user interface 112A belongs to in order to access a form. The application 111A is executing, for example, on a client workspace computer 110A on a client workspace web site. The client workspace computer 110A would typically be a desk top or a lap top that is not easily moved. However, users are moving more toward using other types of channels, such as emails, text or short message services (SMS) that are easily accessible on mobile client devices instead of a conventional application user interfaces 112A. Using mobile client devices enables the user to check and perform various actions on various tasks anywhere and anytime without logging into the application 111A that provides the user interface 112A with the forms, as discussed herein.

Figure 1A:
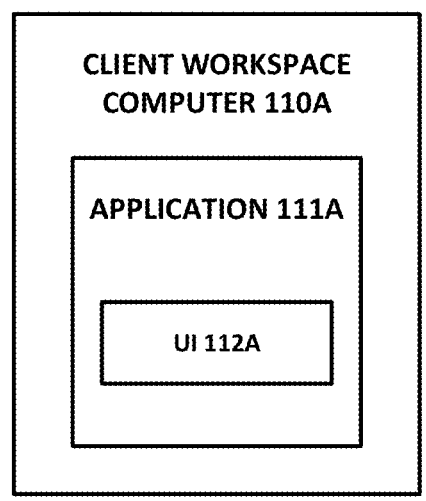
FIG. 1A is a block diagram of a client workspace computer.
Figure 1B:
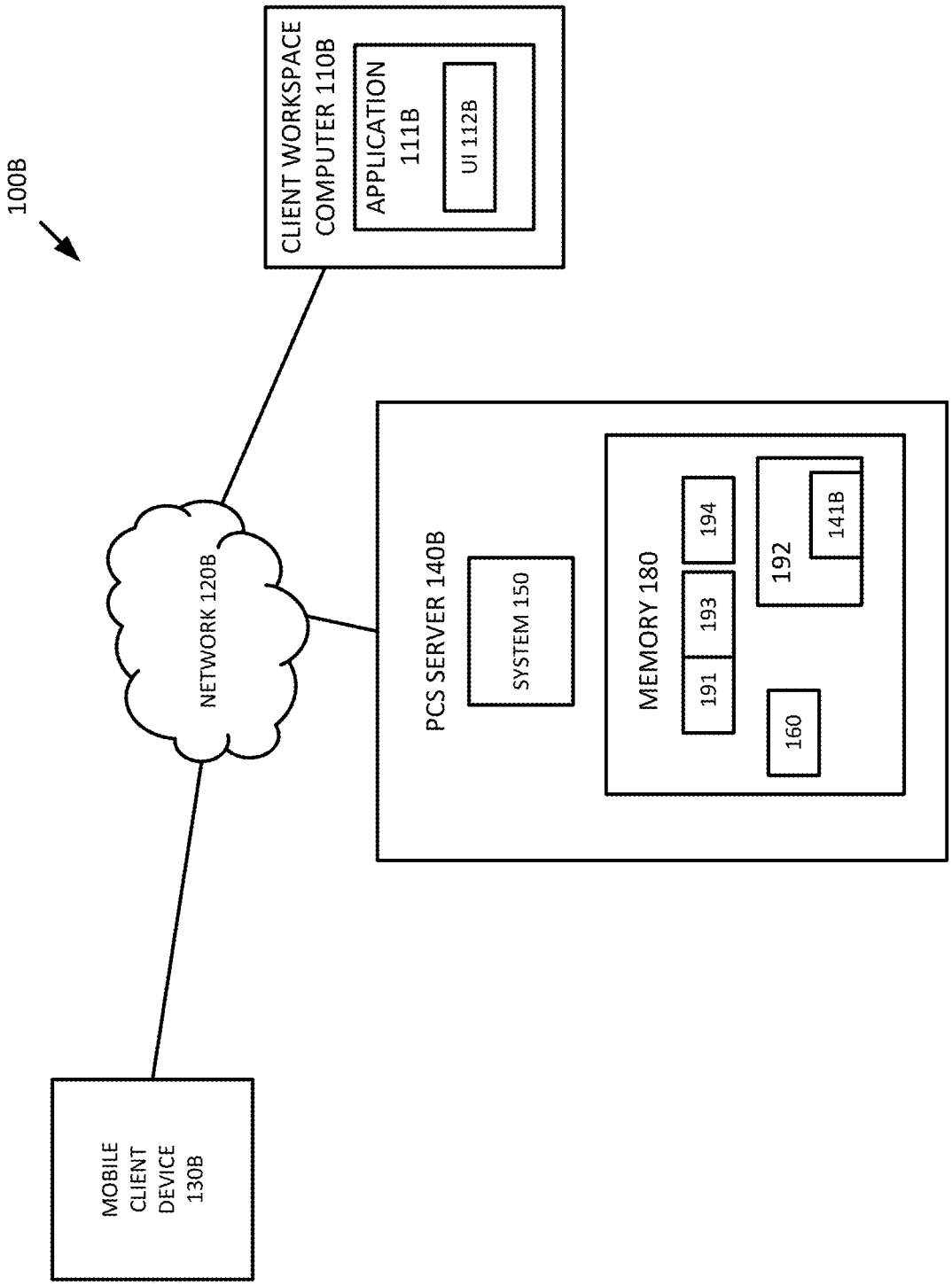
FIG. 1B is a block diagram of a system, according to one embodiment.

FIG. 1B is a block diagram of a system 100B, according to one embodiment. It includes a mobile client device 130B, a network 120B, a PCS server 140B, and a client workspace computer 110B. An application 111B resides and executes on the client workspace computer 110B. The application 111B has a user interface 112B. The PCS server 140B includes memory 180 for storing various data structures, such as template(s) 191, task(s) 192, and string(s) 193. Each of the task(s) 192 have a status 141B. The PCS server 140B also includes a system 150 that creates and processes the various data structures stored in memory 180. One or more of the data structures can be stored in a database. Various embodiments provide for the user to check and perform various actions on various tasks anywhere and anytime using their mobile client devices 130B without logging into the application 111B (FIG. 1B), as discussed herein. Examples of a mobile device 130B are personal device assistant (PDA), smart phones, iPhones, and so on.

Referring to FIGS. 1A and 1B, the data structures stored in memory 180 are used to provide a customized email 193 so that a user can perform actions with respect to a task 192 from a mobile client device 130B instead of being tied to a relatively stationary client workspace computer 110A.

Productivity improvements are provided to support user actions of human task from their email application without the need to go to a process Cloud Services (PCS) application. In the traditional Business Process Management (BPM) workflows, a user opens the workflow application to complete the task assigned to them. According to various embodiments, all the relevant data about the human task is shown along with the form payload, which can be generated dynamically using a templating mechanism such as mustache at runtime as an email to the user. Mustache is a simple web template system with implementations available for ActionScript, and many other languages. In other embodiments, various data described herein can be generated and handled by various methods and systems, as desired. With this approach, a user can see all the relevant data in the email. The user can also interact with action links in the email itself. Therefore, the user can take action on the task from their email itself without the need to login into the client workspace website or into the application for the user interface, as discussed herein.

A composer user interface is provided that enables a user to manage templates by creating an email template, updating an existing email template and deleting an email template. The existing email template may have been previously created by a user or may have not been created by a user because it was provided as a default template with the system.

A user can create email templates, according to various embodiments. For example, when working with email templates, the user can create a Hypertext Markup Language (HTML) file for formatting and layout. To include data, they can use templates, as discussed herein. Templates provide a way to include data references in an HTML file. The template can be a mustache template or a jade template.

A simple example of a mustache template is as follows:
<p>Hello {{first_name}} {{last_name}}</p>
with the following data:

```
{
"first_name": "Joe",
"last_name": "Smith"
}
```

The above simple example will yield:
<p>Hello Joe Smith</p>

User Interface Forms

Figure 2:
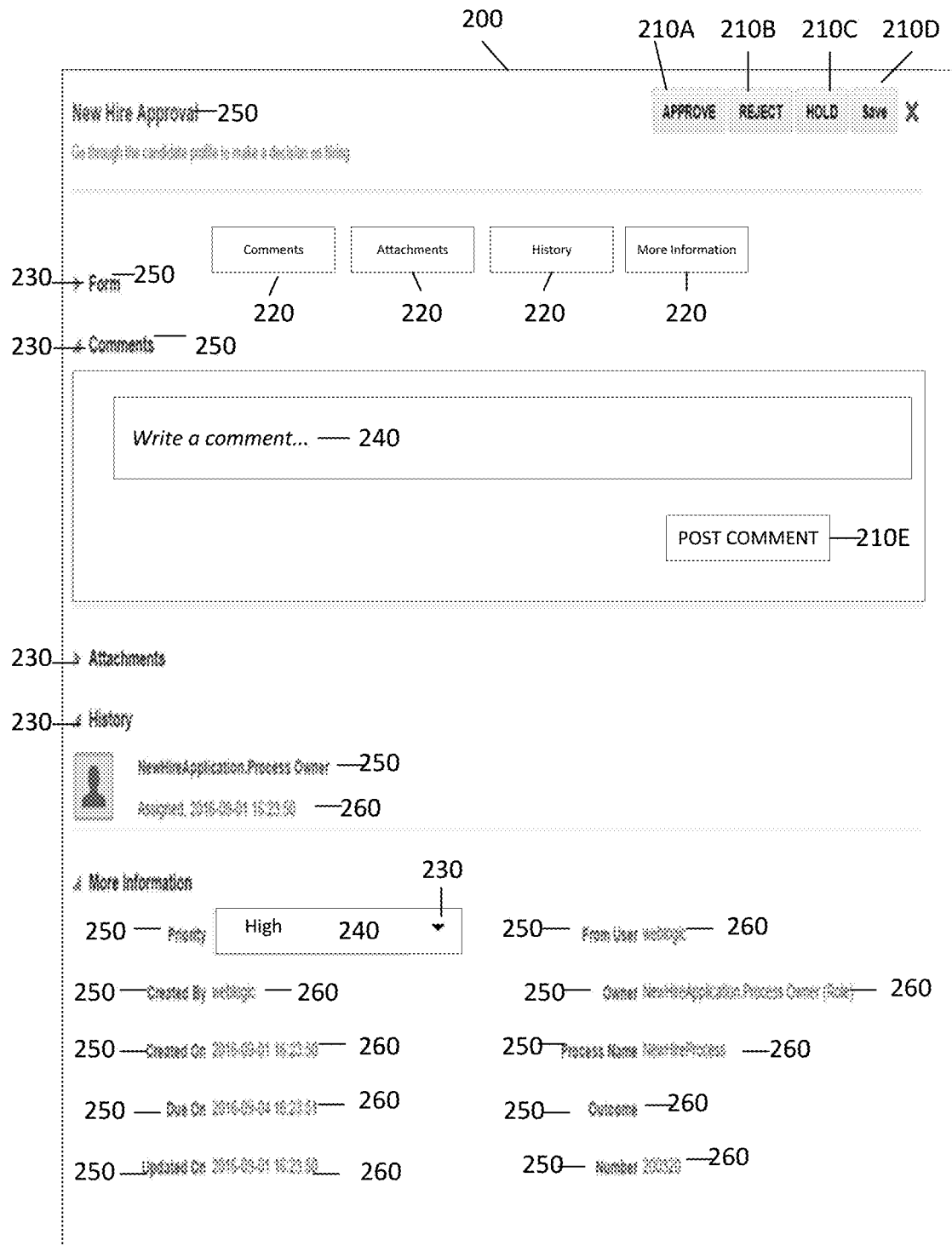
FIG. 2 depicts a block diagram of a form that is displayed, according to one embodiment.

FIG. 2 depicts a block diagram of a form 200 that is displayed, according to one embodiment. A user interface displays the form 200 on a hardware display screen of the user interface 112B of a client workspace computer 110B (FIG. 1B). The user logs into an application 111B (FIG. 1B) that the user interface belongs to in order to access a form 200. As depicted in FIG. 2, the form 200 is used for a new hire process. Embodiments are well suited for other types of forms. The form 200 has various data associated with the form 200 including one or more of names of data entry fields 240, names of labels 250, displayed information 260, data entered into fields 240, and user selectable controls 210, 220, 230 for performing actions. The user selectable controls 210, 220, 230 enable the user to take actions. Therefore, at least user selectable controls 210 are examples of "actions," "action buttons," or "action controls." Controls 230 enable expanding and collapsing information.

Although various embodiments are described in the context of email, various embodiments are well suited to other types of channels (also known as "user delivery mechanisms"), such as short message services or snippets.

Therefore, according to various embodiments, data associated with a form 200 is communicated from the client workspace computer 110B (FIG. 1B) over a network 120B to an email client residing on a mobile client 130B (FIG. 1B). The data of the form 200 includes one or more of names of data entry fields 240, names of labels 250, displayed information 260, data 240 entered into fields, and user selectable controls 210 for performing actions. The client workspace computer 110B executes an application user interface 112B that provides forms, such as the form 200.

According to one embodiment, self-describing data is used as a part of generating the email 193. For example, a string 160 is created that describes what each piece of data is and what it is for. This is referred to as a string 160 that self-describes the data that is in that string 160. For example, the string 160 can contain information that bytes 1-3 of the string is for a first field of the form, bytes 4-8 of the string is for a second field of the form, and so on. According to one embodiment, a template 191 is used for the purposes of generating the string that self-describes the data of the form. However, various embodiments are well suited to other types of templates that enable strings to self-describe the data that they contain, as is well understood by one of ordinary skill in the art. By using non-propriety formats for the templates, such as mustache or jade, various embodiments provide for a platform independent open architecture.

FIG. 2 is just one example of a form used in performing a task. Various embodiments are well suited for any type of form and any type of task. Different kinds of forms can be used for different types of tasks. Various embodiments are well suit for accommodating different kinds of data for different kinds of tasks for at least the reason of using strings that include self-described data.

According to one embodiment, a template 191 may also include formatting information, such as height, col, or span, that provide instructions or information on how to format the email 193.

An embodiment provides for the form and form data to fit on a display screen of a substantially stationary client workspace computer by reformatting the form data to fit a display screen of the mobile client device. For example, the layout can reformat the form data to the display screen of the mobile client device by specifying which of the form data will be included in the customized email, positioning of the form data in the customized email, and specifying font size and font style of the form data. The layout can filter out some of the form data so there is less form data to be displayed on the mobile client device. Filtering can be used to identify a subset of the form data received in the payload is used to create the customized email. The form data can be positioned differently in the customized email than in the form. The form data can be made smaller by changing the font size and/or font style. The form data can be made easier to read on a mobile client device, despite being smaller, for example, by changing the font style. For example, a smaller font size could be used while changing the font style of at least some of the form data to bold.

Figure 3:
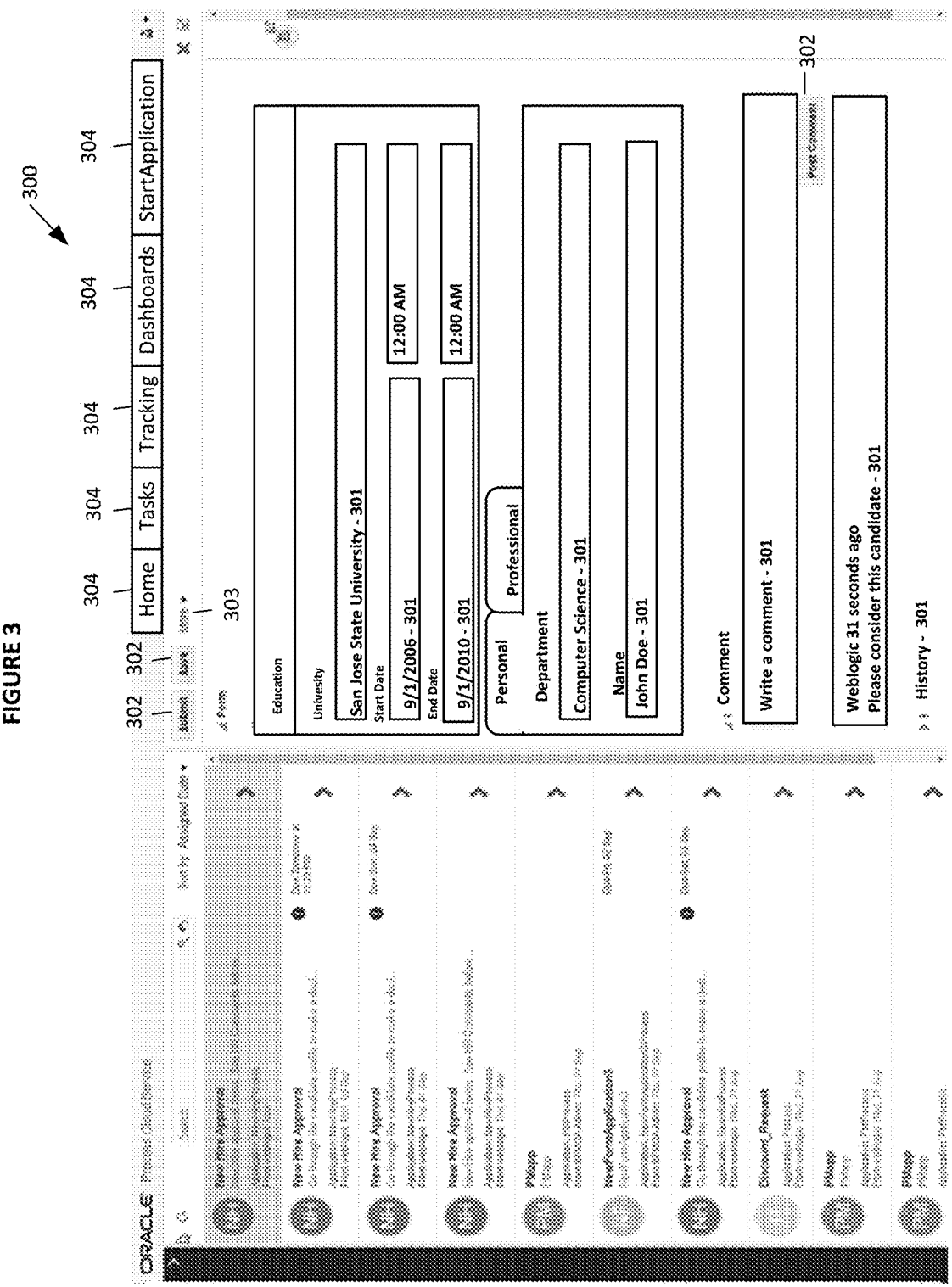
FIG. 3 depicts a form, according to one embodiment.

FIG. 3 depicts a form 300, according to one embodiment. The form 300, according to one embodiment, would be displayed and accessed through a user interface 112B (FIG. 1B). The form 300 pertains to new hire approval. It includes data entry fields 301 for education, start date, end date, personal, department, name of the new hire, comments, web log, history and so on. It has buttons 302 that include a post comment button, a submit button, save button. Submit and save are examples of actions. It has a drop down menu 303 for more options. It has icons 304 for home, tasks, tracking, dashboards, and start application.

FIG. 4 depicts a customized email 400 that was generated based on the form 300 depicted in FIG. 3, according to one embodiment. The customized email 400 would be accessed and displayed using a mobile client device 130B (FIG. 1B), according to one embodiment. The customized email 400 depicts similar information 402 to what was entered into and/or appears on the form 300. It can also include additional information that was generated, for example, based on information entered into the form 300. The email 400's information 402 depicts the name of the person the form 300 is from, a summary of the task, the priority of the task, the date the task was created, and the date the task is due to be completed. The email 400's information 402 includes candidate (e.g., person being considered for the job) information, such as the name of the candidate, the department the candidate is being considered for, the candidate's education, the start date, the end date for completing the task, the candidate's experience, the candidate's skills, and comments. The email 400 includes an approve button 401. According to one embodiment, the user can approve the task by selecting the action link in the email that corresponds with the approve button 401 on the email. Other buttons that correspond with actions on form 400 are hold and reject.

Figure 5:
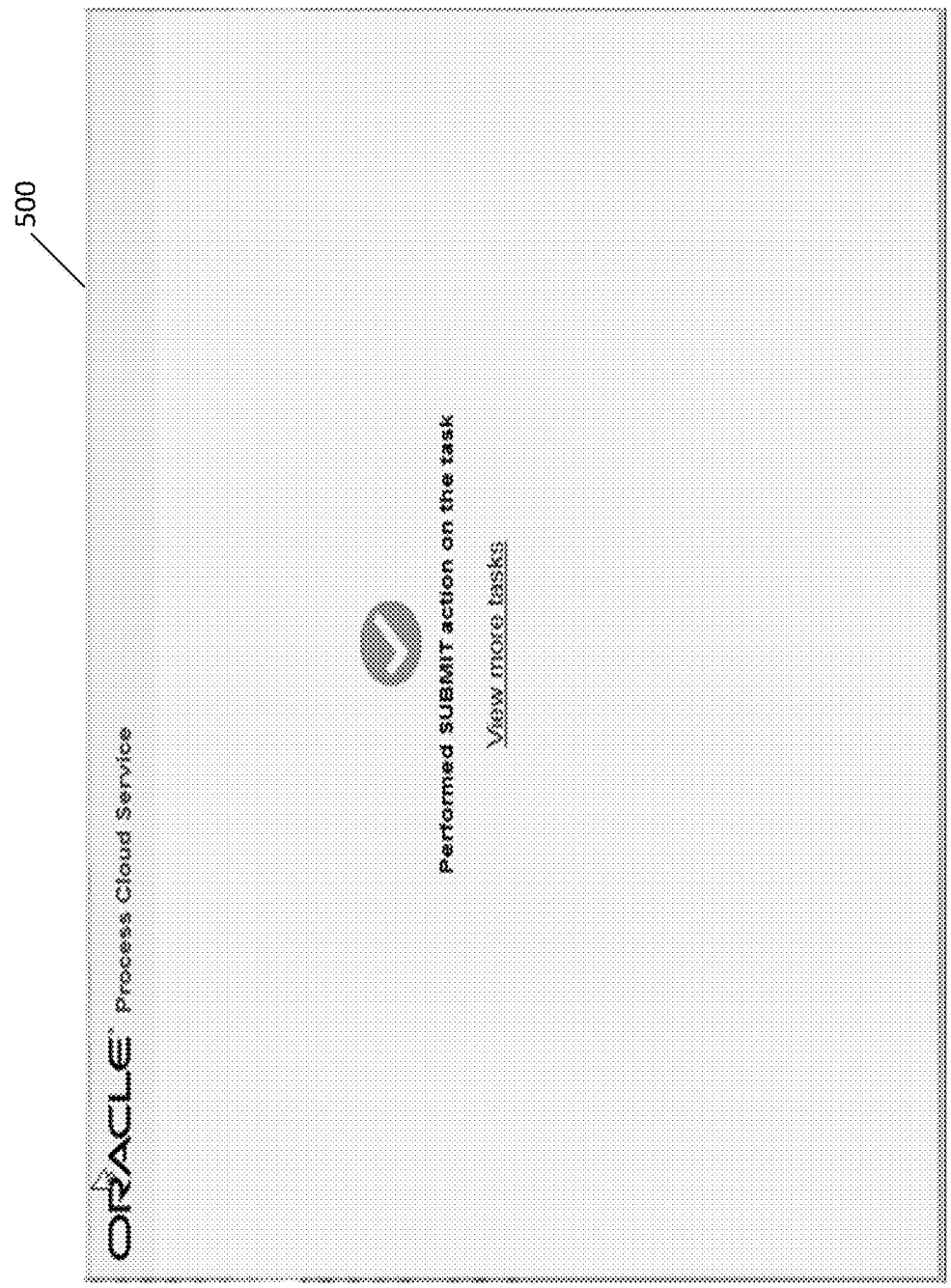
FIG. 5 depicts a message that is displayed when a user clicks an action link in a customized email, according to one embodiment.

FIG. 5 depicts a message 500 that is displayed when a user clicks on an action link, such as the approve button 401, in a customized email, according to one embodiment. The message 500 would be displayed using a mobile client device 130B (FIG. 1B), according to one embodiment. The message 500 indicates that the action on the task was submitted successfully. Further, the message 500 provides a link for viewing more tasks.

Working with Email Templates in the Composer User Interface

Figure 6:
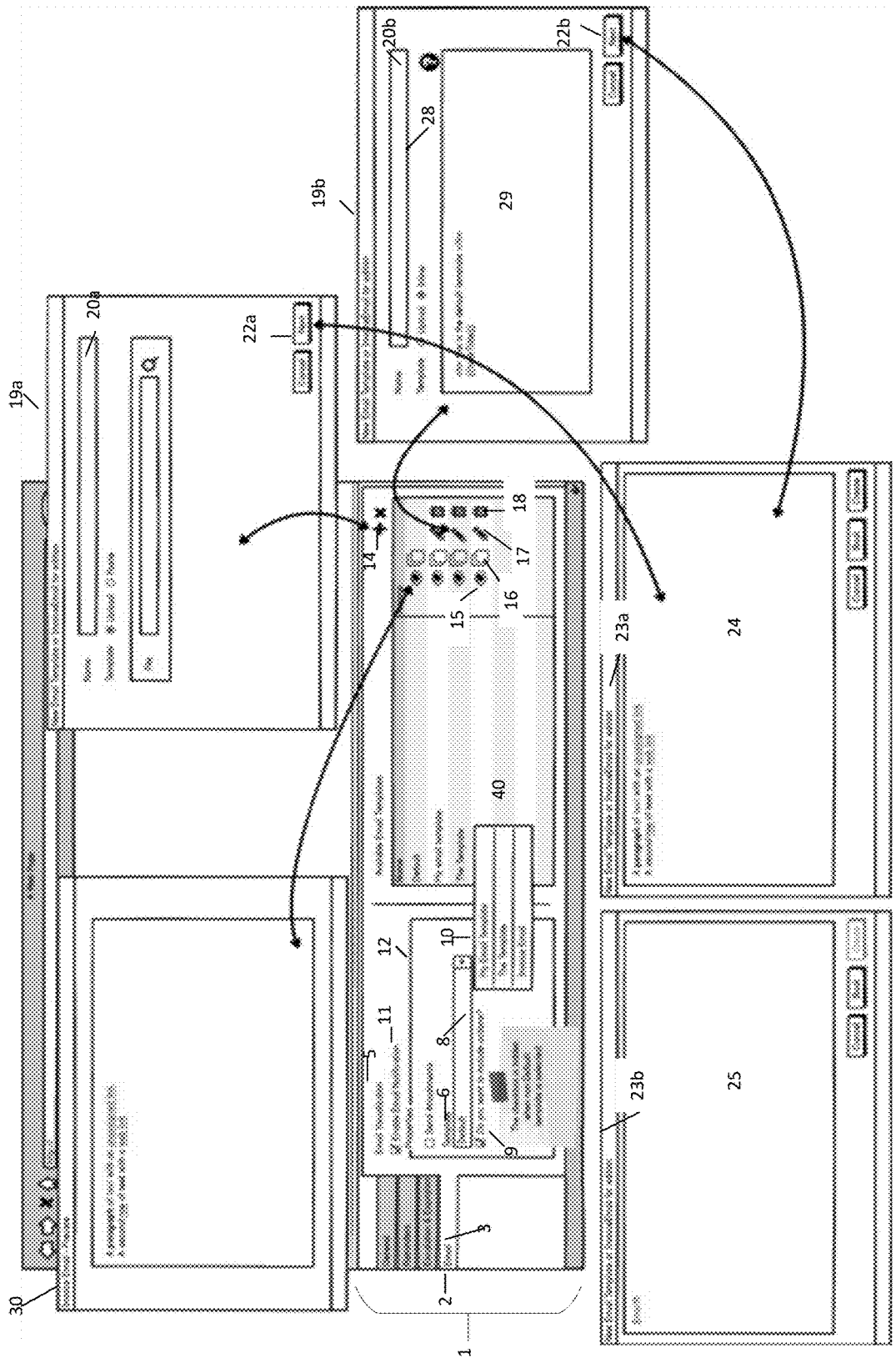
FIG. 6 depicts a block diagram of pages of a composer user interface for working with Email Templates, according to various embodiments.

FIG. 6 depicts a block diagram of pages 600 of a composer user interface for working with email templates, according to various embodiments. The pages 600 are provided by the PCS server 140B (FIG. 1B) and are displayed on a hardware display screen by a user interface 112B of a client workspace computer 110B (FIG. 1B), according to one embodiment.

The user task properties panel 1 provides access to the email templates. "Notification" 2 is an item that is listed in the panel 1. The "Notification" 2 provides a link 3. Selecting this link 3 will open up the panel 4. The panel 4 includes a left side 5 and a right side 13. On the left side 5, the user is able to select an email template 6 for this user task 7. If the user selects default 8, a checkbox 9 is provided indicating whether the generated email should include actionable actions. There is an actionable Email wiki 10 with a listed user task 40. By default the Enable Email Notification checkbox 11 will be off, and only if the user selects this checkbox 11 will the properties area 12 below become enabled. When the checkbox 11 off, the user task will execute in a conventional manner. On the right side 13, the user will be able to manage the project's email templates. There are user selectable buttons 2-18: an add a new template button 2, preview a template button 15, copy a template button 16, edit a template button 17, and delete a template button 18. Copying is also referred to as cloning. Editing and adding a new template will behave similarly. Editing and adding will both launch a two page wizard. There are two types of the first page, which are first pages 19a, 19b. There are two types of second page, which are second pages 23a, 23b. On the first page 19a (also called "upload template page") the user can upload an email template (HTML file). First page 19b (also called a "create template page") can be used to create an email template inline in a plain text field 29. If adding a new template, the user will create a name in a data entry field 20a, 20b. If editing, the name in the data entry field 20a, 20b will be read-only, and the plain text field 29 will be populated by the template. When the user selects the next button 22a, 22b, a second page of the wizard will appear. If processing of the template proceeded correctly, the second page 23a will show the rendered HTML 24. If there was an error, the second page 23b will display an error message 25. The second page 23a or 23b can be reused to provide a preview page 30 when the user select Preview button 15. Selecting the copy button 16 will ask the user to enter a new name in a data entry field 20a, 20b and processing will copy the template 29, using that new name.

Although most of the data inside the mustache data template is available at runtime, some data is available, according to one embodiment, in the task object. This may allow for a preview to resolve some of the mustache template tokens to real data, such as task name, while other data, such as payload data, would remain in the curly braces.

Although various embodiments have been described using HTML, embodiments are well suited for other types of markup languages besides HTML. For example, other types of markup languages can be used for templates and/or customized emails.

Workspace/Composer Shared Library

Workspace provides a shared library for working with the templates. For example, an OutputStream of HTML can be returned with mustache tokens replaced with real data. Further, some data is available (e.g., task name) while other data (e.g., form payload) are available at runtime. For example, the error message may contain information helping the user to fix the problem. The error message may contain information to scripting errors in the HTML. The error message provides an actionable default template, and can also provide a default template with no actions.

An Example Of A Pcs System

Figure 7:
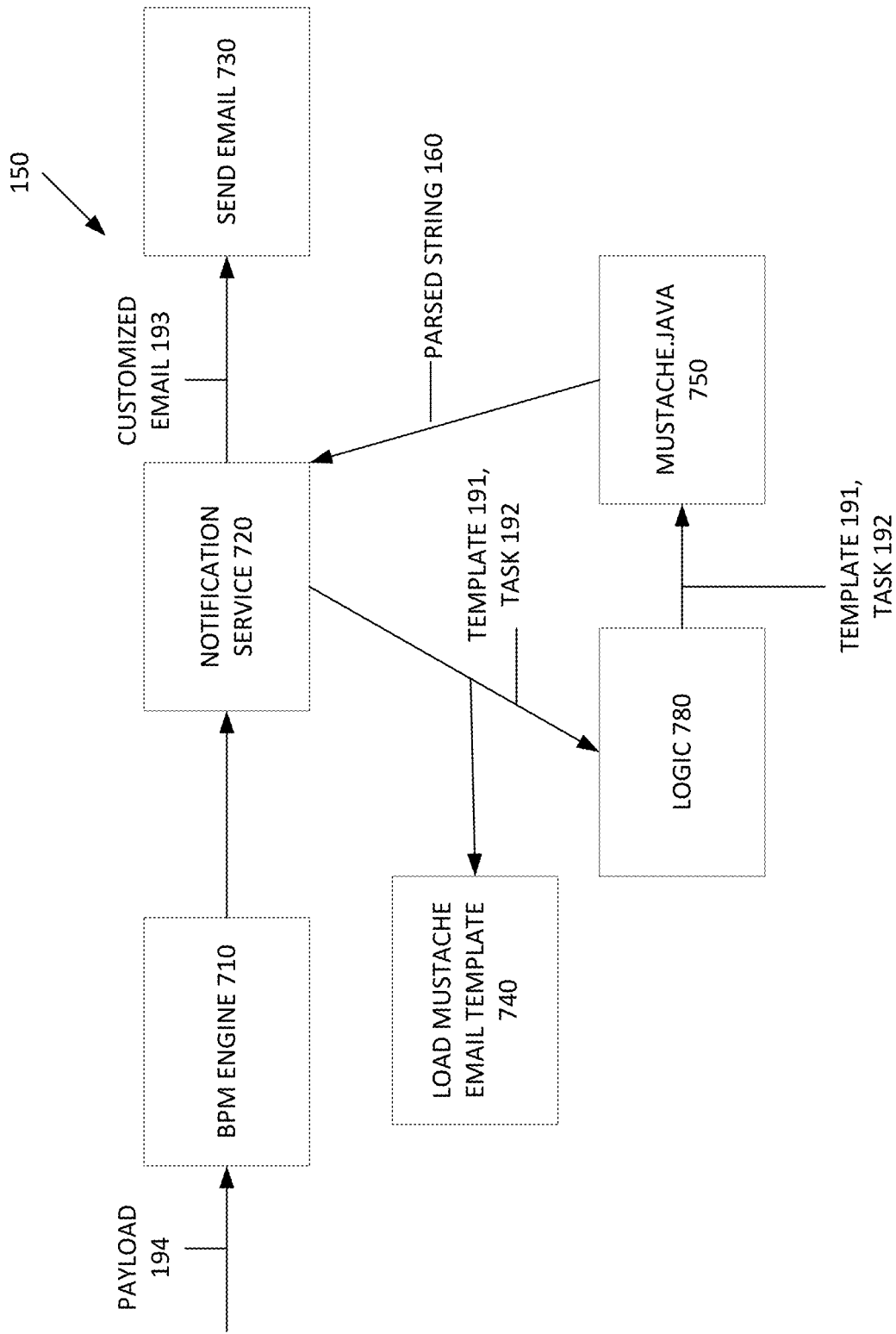
FIG. 7 depicts a block diagram of an implementation of system on a server, according to various embodiments.

FIG. 7 depicts a block diagram of an implementation of system 150 on a Process Cloud Services (PCS) server 140B (FIG. 1B), according to various embodiments.

The system 150 includes a business process management (BPM) engine 710, a notification service 720, a load mustache email template 740, logic 780, a mustache.java 750, and a send email function 730.

The business process management (BPM) engine 710 is capable of determining what the user wants. For example, it is able to convert the holding objects which include the payload data 194 from the form. When a new human task is requested, the engine 710 is called and creates an instance of a process for that new human task. As discussed herein, embodiments are well suited for other channels besides email, such as short message service (SMS). The notification service 720 reads the template. The engine 710 creates a task 191, reads the task 191, parses the payload data 194 from the form and understands the payload data 194 from the form. According to one embodiment, the task 191 is a task object. The load mustache email template 740 accesses a template 191, as discussed herein. The template 191 may be a pre-existing template that is uploaded, for example from page 19a (FIG. 6), or may be a newly created template, for example from page 19b (FIG. 6). For example, the task 192 can represent a new hire approval. The logic 780 understands the task 192 and performs payload mapping. The logic 780 uses a task 192 and provides that template 191 and that task 192 to the mustache.java 750. The mustache.java 750 generates the parsed string 160 based on the form's data in the payload 194 and the template 191, as discussed herein, and passes the parsed string 160. The parsed string 160 is a string with self-described data of the form, as discussed herein. The notification service 720 generates an email 193 based on the template 191 and the parsed string 160. The notification service 720 transmits the generated email 193 to the send email function 730 which then transmits the generated email 193 from the system 150.

First, as discussed herein, the email 193 (FIG. 7) that is transmitted from the process cloud services (PCS) server 140B (FIG. 1B) to the mobile device 130B (FIG. 1B) includes complete task context. For example, the email 193 (FIG. 7) includes one or more pieces of information from 210-260 (FIG. 2) of the form 200 (FIG. 2).

Second, the email 193 (FIG. 7) indicates some type of action, which can be performed with respect to the data of the human task More specifically, according to one embodiment, the email 193 (FIG. 7) includes information pertaining to at least one of the controls 210, such as approve, reject, hold, save, etc . . . As will become evident, the information pertaining to the controls 210 is used to enable a user to take action while interacting with an email 193 (FIGS. 1B and 7) on their mobile device 130B (FIG. 1B). Web sessions are used for web applications. However, according to various embodiments, a web application and web session are not used. Various embodiments provide for taking action, as discussed herein, without associated web session of the workspace application 110B (FIG. 1B).

Third, various embodiments provide for security. For example, a unique ID is associated with a particular instance of a task 192 (FIG. 7) for a particular action of a form for a particular user. When the user selects an action link on an email 193 (FIG. 7) that corresponds with the particular action from that same form, a response is transmitted from the mobile device 130B (FIG. 1B) back to the PCS server 140B (FIG. 1B) with the unique ID. The PCS server 140B (FIG. 1B) decrypts the unique NID and verifies the user's right to act upon the human task. More specifically, the PCS server 140B (FIG. 1B) has context information when it transmits an email 193 (FIG. 7) for a human task to a mobile device 130B (FIG. 1B). More specifically, the PCS server 140B (FIG. 1B) would know that it is waiting for the task to be approved by and knows which user needs to approve the task. If the user selects the approve button 401 (FIG. 4) a second time, the application 111B on the client workspace computer 110B (FIG. 1B) will know that it has already been approved and will reject the second approval.

Mustache Task Object

Table 1 depicts a sample of a mustache template, according to one embodiment.

```
Map<String , Map <String,Object>> payload;
//Task related attributes
String title;
String creator;
String ownerGroup;
String ownerRole;
String ownerUser;
String priority;
String fromUser;
String outcome;
String taskId;
String state;
String shortSummary;
String longSummary;
String processName;
String assignedDate;
String createdDate;
String endDate;
String updatedDate;
String dueDate;
String startDate;
String taskDefinitionId;
//PCS Application related attributes
String assignee;
String url;
String logo;
int currentYear;
List<Comments> comments;
```

-continued

```
Comments {
String commentStr;
String updatedBy;
String updatedDate;
}
// Actions related attributes
List<Actions> actionsList;
Map<String ,Actions> actionsMap;
String actions;
Actions {
String actionName;
String actionDisplayName;
String url;
}
```

Referring to Table 1, the variables of a template can be used for pieces of form data 210-260. Examples of the template variables depicted in Table 1 include strings for title, creator, ownerGroup, ownerRole, ownerUser and so on through taskDefinitionID. The user that created a task can be associated with string fromUser of the template or the date a task was created can be associated with the string createDate of the template. Any data that is entered into a data entry field can be associated with a variable of a template. The template can also include PCS application related attributes such as the assignee of the task, a Universal Resource Locator (URL), a logo and the current year. The URL is for accessing a human task on PCS web application communicating with the PCS server. Comments associated with a form can be associated with the List<Comments> comments of the template. Actions associated with user controls of a form can be associated with the List<Actions>actionsList of the template. The Map<Strings, Actions>ActionsMap (also referred to as "ActionMap"). The ActionMap is used by the action name in the template. For example, a developer can use it to display different buttons for different actions in different colors. The approve button may be green and the reject button may be in red. The Map<String, Map <String, Object>> Payload is for mapping the pieces of form data in the payload 194 to the template 191.

Composer Implementation

Figure 8:
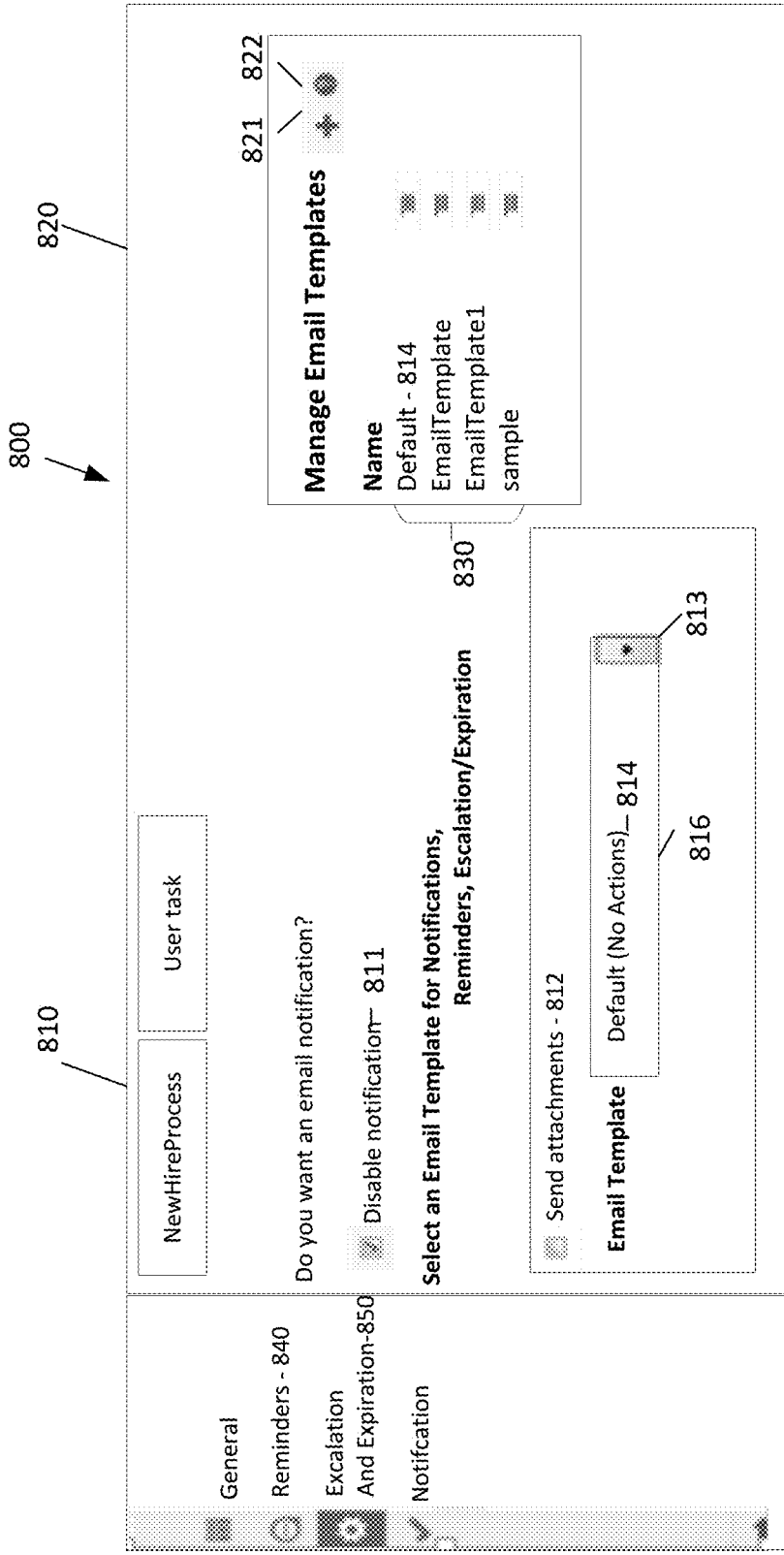
FIG. 8 depicts a block diagram of a notification property panel, according to one embodiment.

FIG. 8 is a block diagram of a notification property panel 800, according to one embodiment. The notification property panel 800 is another example of a notification property panel 1 of FIG. 6. The notification property panel 800 has a left side 810 and a right side 820. On the left side 810, the user selects an email template for the selected user task. The right side 820 can be used to manage the Application's email templates. A list 830 of email templates' names are depicted on the right side 820. Examples of the email templates include mustache templates and jade templates.

The information from the notification property panel 800 is used to create the task 192 (FIG. 7). The task 192 is stored in the PCS Server 140B (FIG. 1B). The status of the task is updated based in the action performed in the customized email.

By default, the 'disable notification' checkbox 811 is deselected. Selecting this checkbox 811 will stop notifications for this task, including the default notifications that are normally sent. If the user has enabled the reminder feature 840 and/or the escalation/expiration feature 850, generated customized emails 193 are still sent. According to one embodiment, the features 840 and 850 will use the template which the user selects from the 'Email Template' menu that can appear when control 813 is selected.

The user can choose to send task-related attachments with the 'Send attachments' checkbox 812.

There is a default template, which can include actions or exclude actions: If actions are included, the user can click a link in the email 193 (FIG. 1B) and Approve or Reject a transaction, for example. The user does not have to log in separately to workspace's application 111B (FIG. 1B). If actions are excluded, then the user can click the link, log in to the application 11B, and complete the task.

The name 814 of the default template appears in the field 816. The default template's name 814 is also displayed on the right side 820 of the panel 800.

When applying a custom email template to a user task, that email template indicated in the field 816 is used for emails 193 generated for Notifications, Reminders, and Escalation/Expiration emails.

A new email template can be used by selecting the '+' button 821. The online help, selected with button 822, includes documentation on how to create a template, as well as information about what tokens are available for inserting data from the human task, such as task 192 (FIG. 7). The task 192 (FIG. 7) includes information 810-850 from the panel 800.

Creating a new email template is a two-step process, according to one embodiment, as discussed herein. Referring to FIG. 6, an example of the two step process is using a first page 19a, 19b to access a template and then using a second page 23a, 23b to either display the rendered email 24 or an error message 25.

Figure 9:
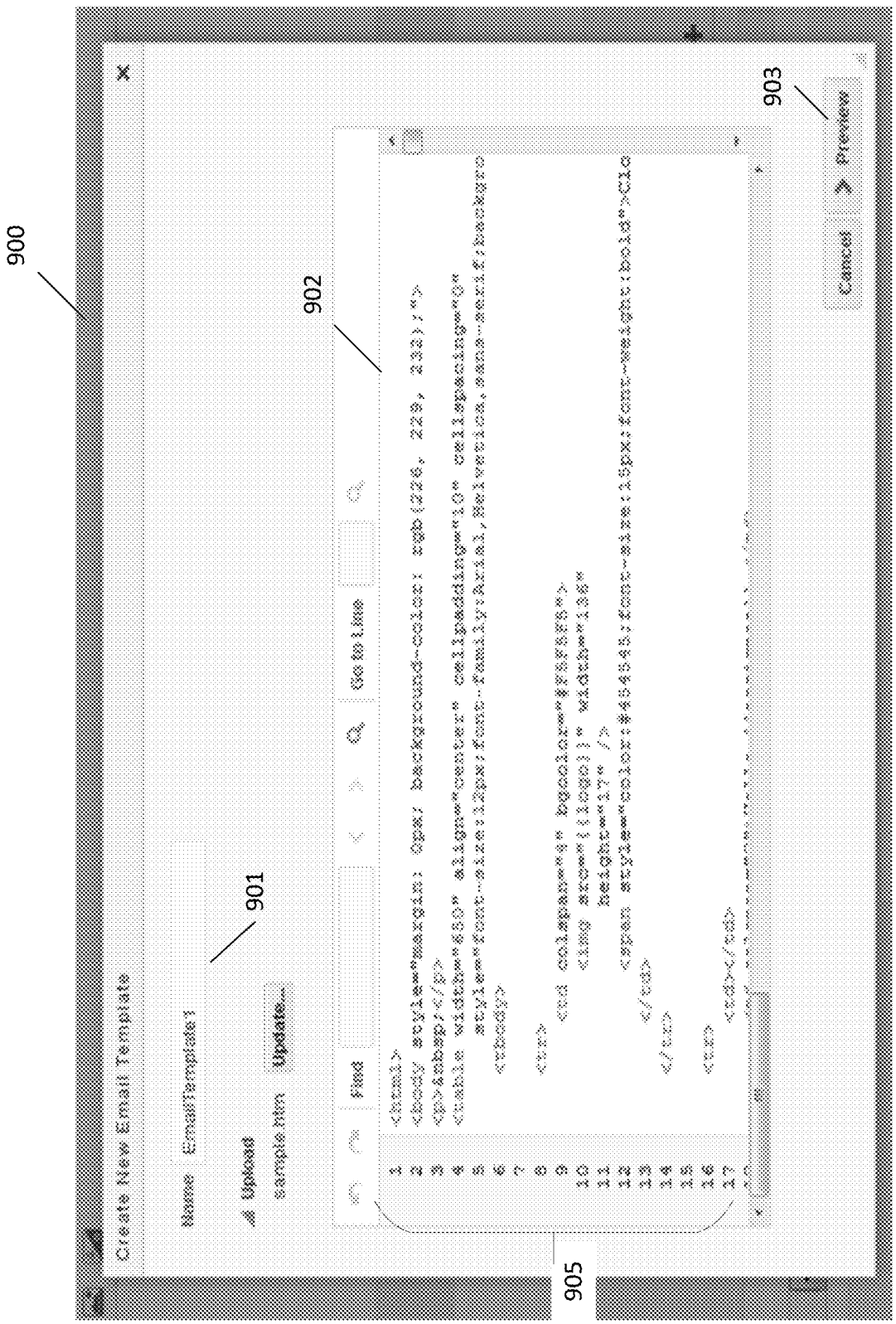
FIG. 9 depicts a block diagram of a page that can be used for creating new email templates, according to one embodiment.

FIG. 9 depicts a block diagram of a page 900 that can be used for creating new email templates, according to one embodiment. The create new email template page 900 provides for entering a template 193 (FIG. 1B). Template 905 is an example of template 193 (FIG. 1B). The template may be uploaded, as depicted in page 900, or provided inline, as depicted in page 19b (FIG. 6). The page 900 provides a field 901 for entering the template name to upload template 905 into area 902 of the page 900. The area 902 interacts with the code editor control. The template 905 is computer executable instructions, for example, in the form of HTML. The template 905 can be entered into area 902. According to one embodiment, the template 905 has computer executable instructions, for example, in the form of HTML. The code editor control interacts with area 902 as part of entering the template 905 into the area 902. According to one embodiment, the code editor control can check the template 905 for proper syntax and so on.

The user can create the template 905 depicted in area 902 by: uploading a file from a local drive into the area 902, copy/pasting a template 905 into area 902 for the code editor control and/or typing/editing in the area 902 of the code editor control.

The user can choose a name for the email template 905, for example, by entering the name into the field 901.

The user can preview the template 905 by selecting the preview button 903.

Figure 10:
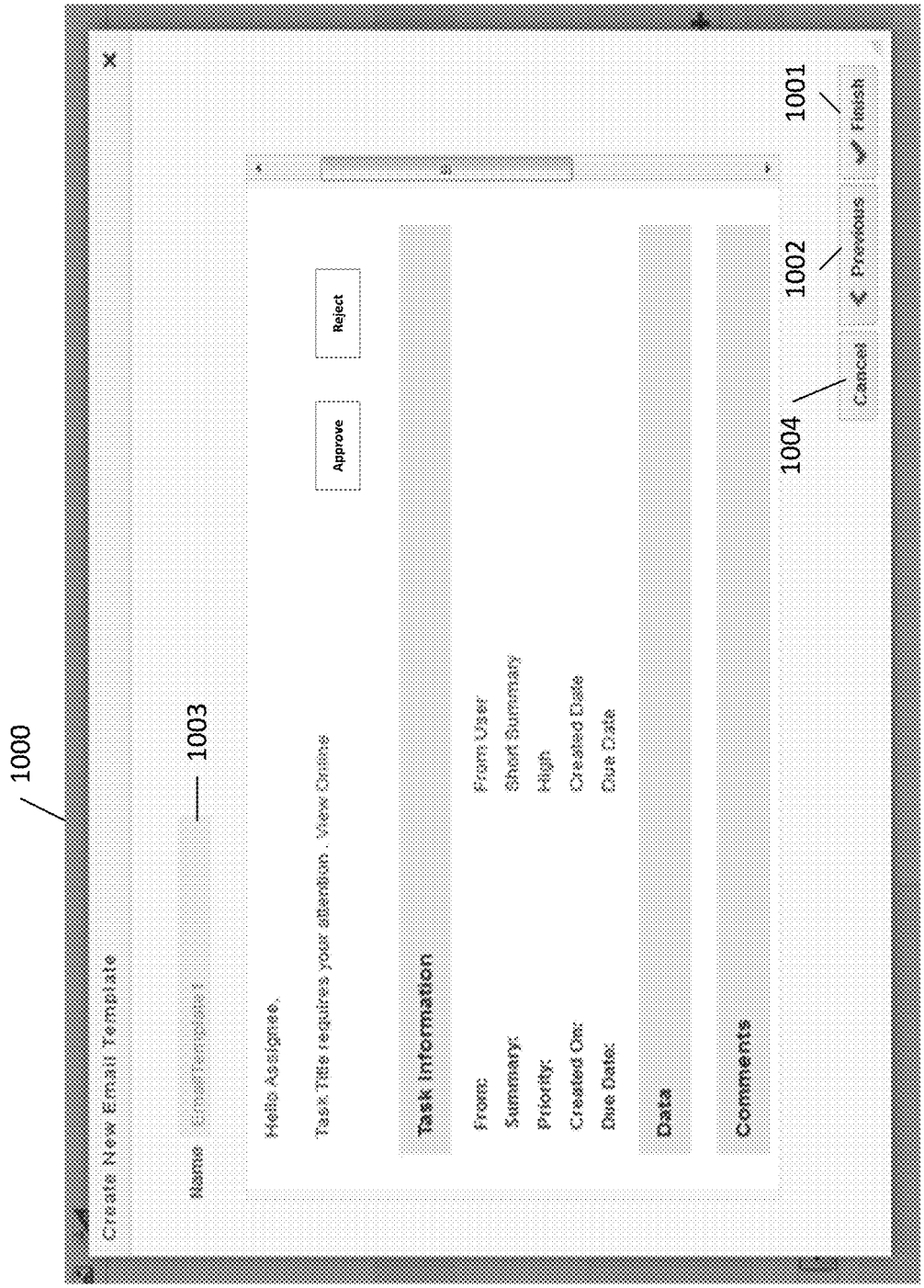
FIG. 10 depicts a block diagram of a page that is displayed in response to a user selecting the preview button, according to one embodiment.

FIG. 10 depicts a block diagram of a page 1000 that is displayed in response to a user selecting the preview button 903 on FIG. 9, according to one embodiment.

Page 1000 displays the email template name 1003 that was entered into field 901. Page 1000 displays the results of executing the template 905 (FIG. 9). As depicted in page 1000, the displayed results of executing template 905 include task information pertaining to who the task information is from, the type summary of the task information, the priority of the task, when the task was created, the due date of the task, data related to the task and comments pertaining to the task.

After previewing, the user can select the finish button 1001 to create the new email template that was previewed, or select the previous button 1002 to return to make further changes to the template as it appears in area 902 of the code editor or select the cancel button 1004.

Figure 11:
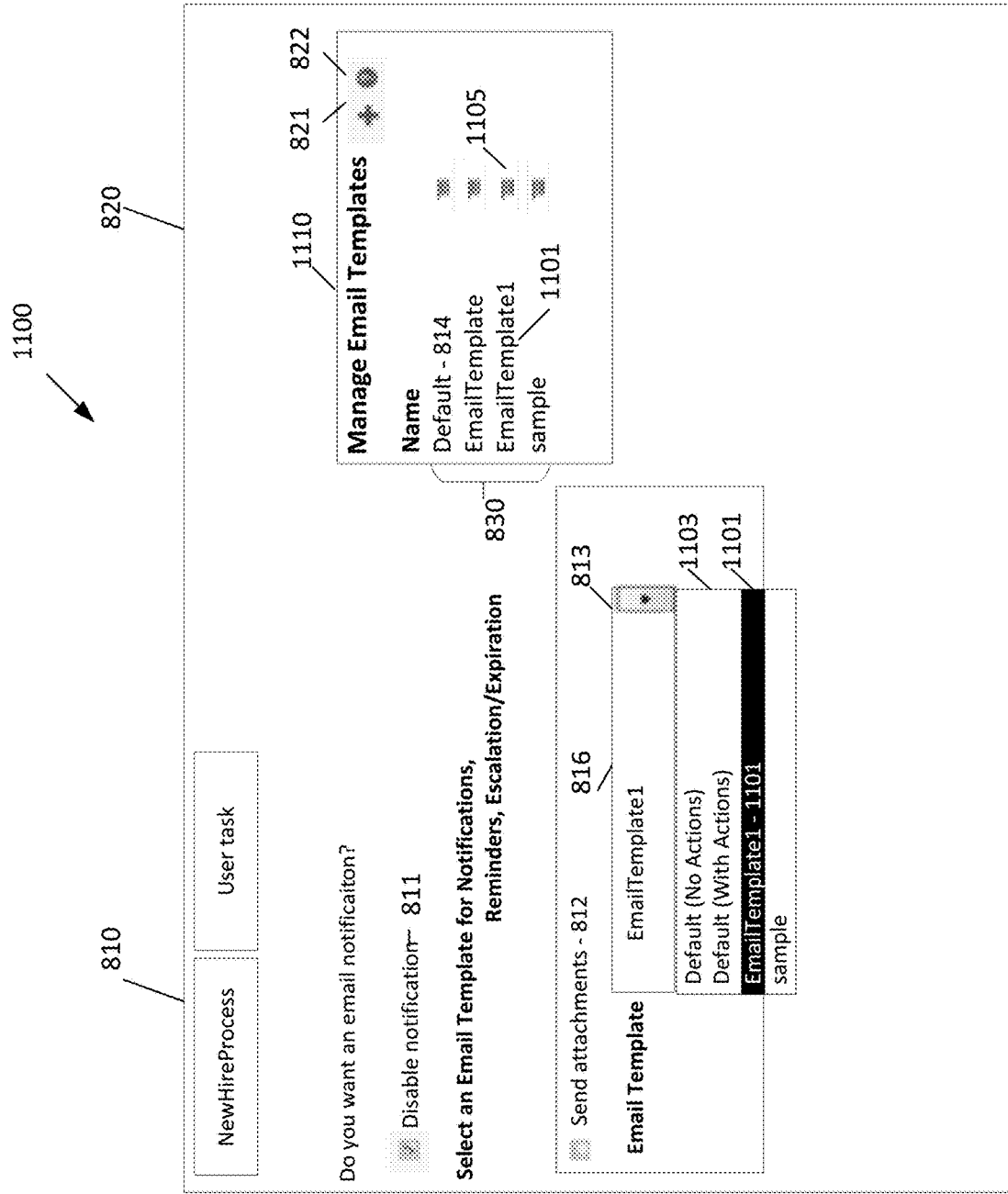
FIG. 11 depicts a block diagram of the notification property panel after a new template has been added, according to one embodiment.

FIG. 11 depicts a block diagram of the notification property panel 1100 after a new template has been added, according to one embodiment.

After the new template is created, which in this illustration is named EmailTemplate1, the new template's name 1101 will appear in both the manage email templates panel 1110 which appears on the right side of the notification property panel 1100 and also in the menu of email templates on the left side of the panel 1100. As depicted in FIG. 11, the new templates name 1101 is depicted in an email template menu 1103 that was displayed in response to user selection of the control 813.

Figure 12:
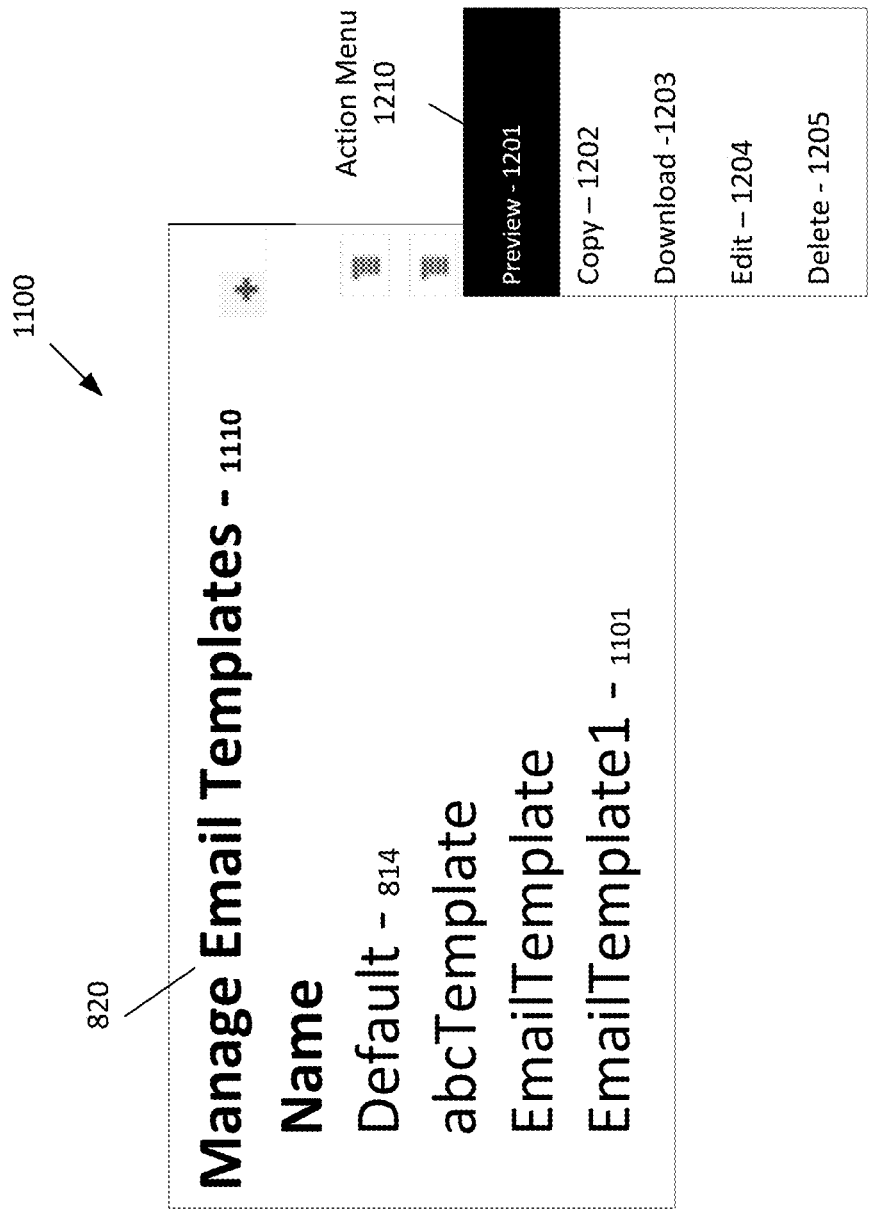
FIG. 12 depicts a block diagram of the manage email templates that appears on the right side of the notification property panel, according to one embodiment.

FIG. 12 depicts a block diagram of the manage email templates 1110 that appears on the right side 820 of the notification property panel 1100, according to one embodiment.

An action menu 1210 has been displayed in response to a user selecting a control 1105. The action menu 1210 displays respective controls 1201-1205 for preview, copy, download, edit, and delete. These controls shall be referred to as the preview control 1201, the copy control 1202, the download control 1203, the edit control 1204, and the delete control 1205.

The five controls 1201-1205 are available for user created templates. Since a default template cannot be deleted or edited, according to one embodiment, controls 1201-1203 are available for default templates. The task 192 (FIG. 7), according to one embodiment, includes information, such as one or more information 810, 820, 811-816 (FIG. 8), 1101, 1103, 1105 (FIG. 11), 1210, 1201-1205 (FIG. 12).

Figure 13:
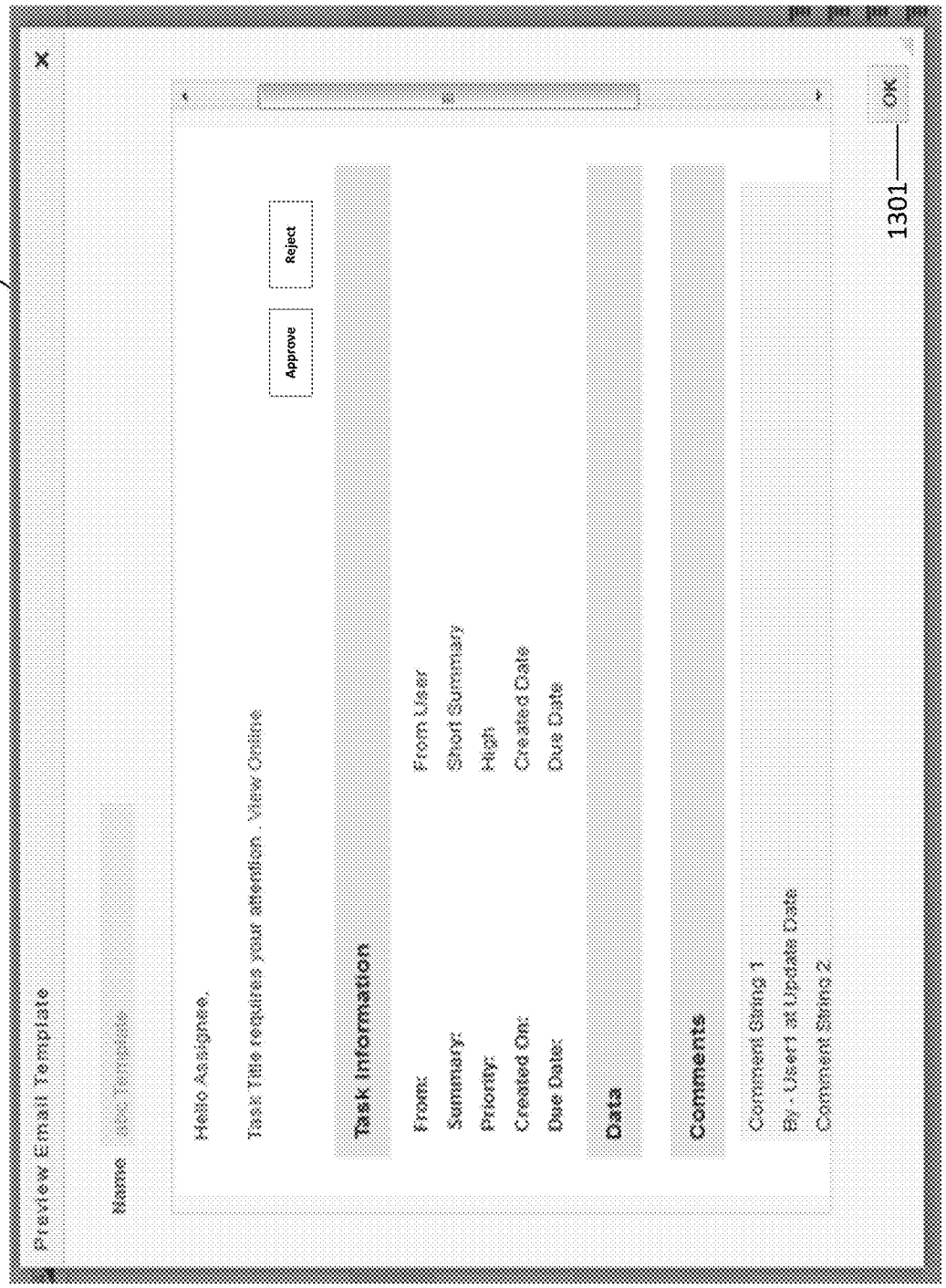
FIG. 13 depicts a block diagram of a page for previewing a template, according to one embodiment.

FIG. 13 depicts a block diagram of a page 1300 for previewing a template, according to one embodiment. The preview page 1300 (also referred to as a "dialog") is associated with the second step of the create email template process discussed at least in the context of pages 19*a*, 19*b* (FIG. 6) and page 900 (FIG. 9). The preview email template page 1300 displays an OK button 1301 to indicate that the user is satisfied with the template that is previewed. Page 1300 includes similar types of information as page 1000, such as task information pertaining to who the task information is from, the type summary of the task information, the priority of the task, when the task was created, the due date of the task, date related to the task and comments pertaining to the task.

Figure 14:
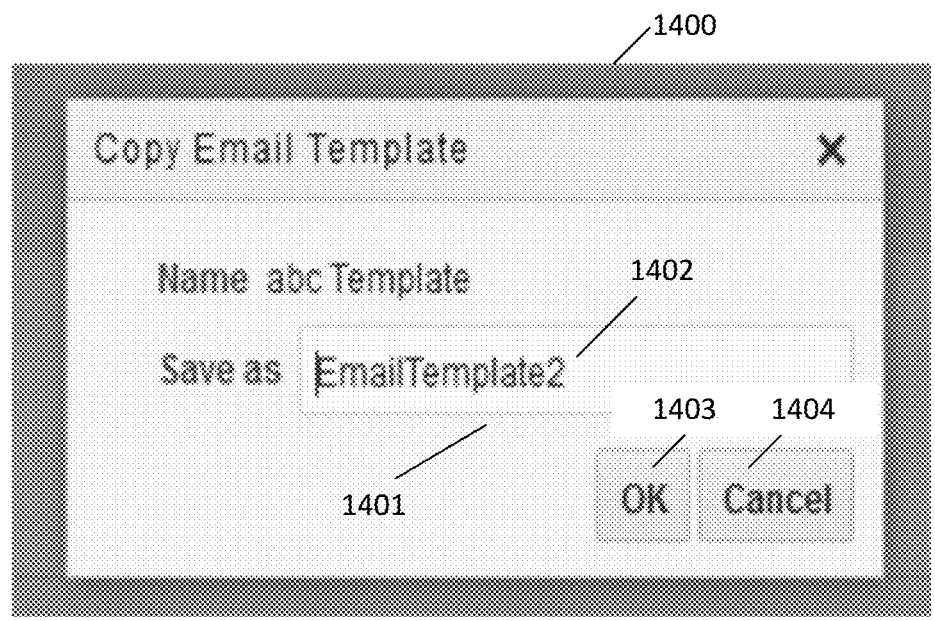
FIG. 14 depicts a copy email template dialog, according to one embodiment.

FIG. 14 depicts a copy email template dialog 1400, according to one embodiment. The dialog 1400 enables the user to enter the name 1402, such as "Email Template2," of a template that the user wants to save. The dialog 1400 provides an OK button 1403 to cause the template indicated in the field 1401 to be saved or a cancel button 1404 to cancel the save. When copying a template, the user can choose the name 1402 of the new template using the dialog 1400.

Figure 15:
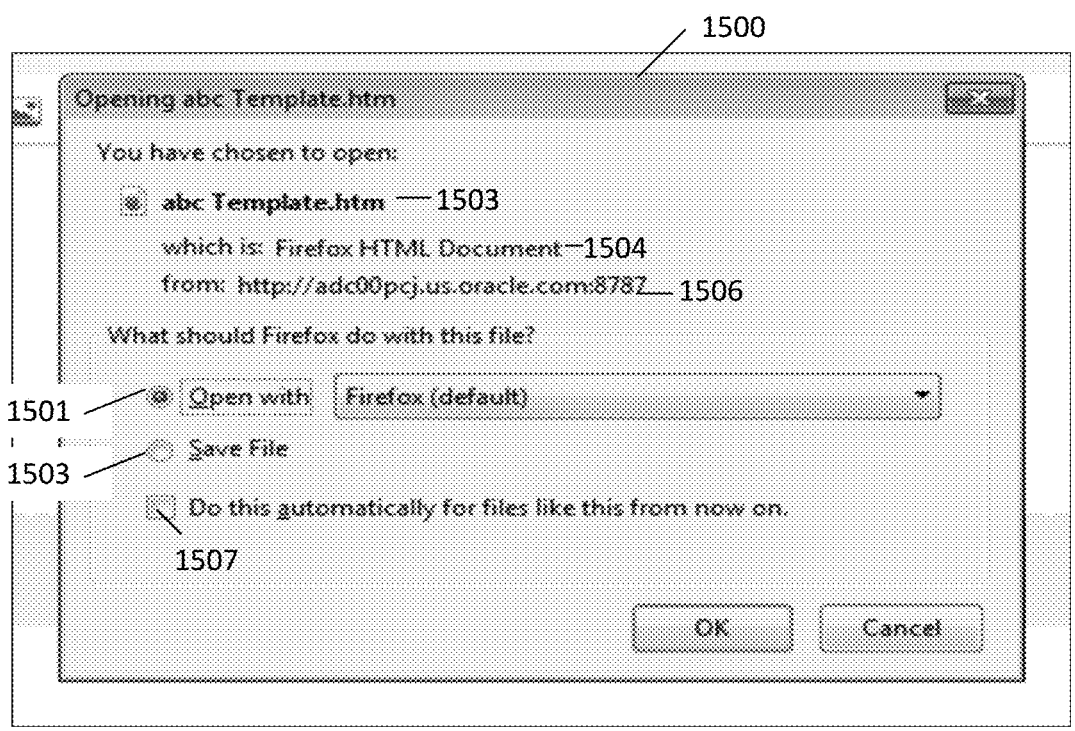
FIG. 15 depicts a browser's download dialog, according to one embodiment.

FIG. 15 depicts a browser's download dialog 1500, according to one embodiment. When downloading a template, the browser's download dialog 1500 will appear. The dialog 1500 depicts the template's name 1503, the type 1504 of document that the template is, and the location 15601 where the template is located. The user can select an option 1507 to automatically perform the processing the user specified in dialog 1500. The user can save the indicated template by selecting the save file control 1502 or choose an application to open the file with by selecting the open file control 1501.

Figure 16:
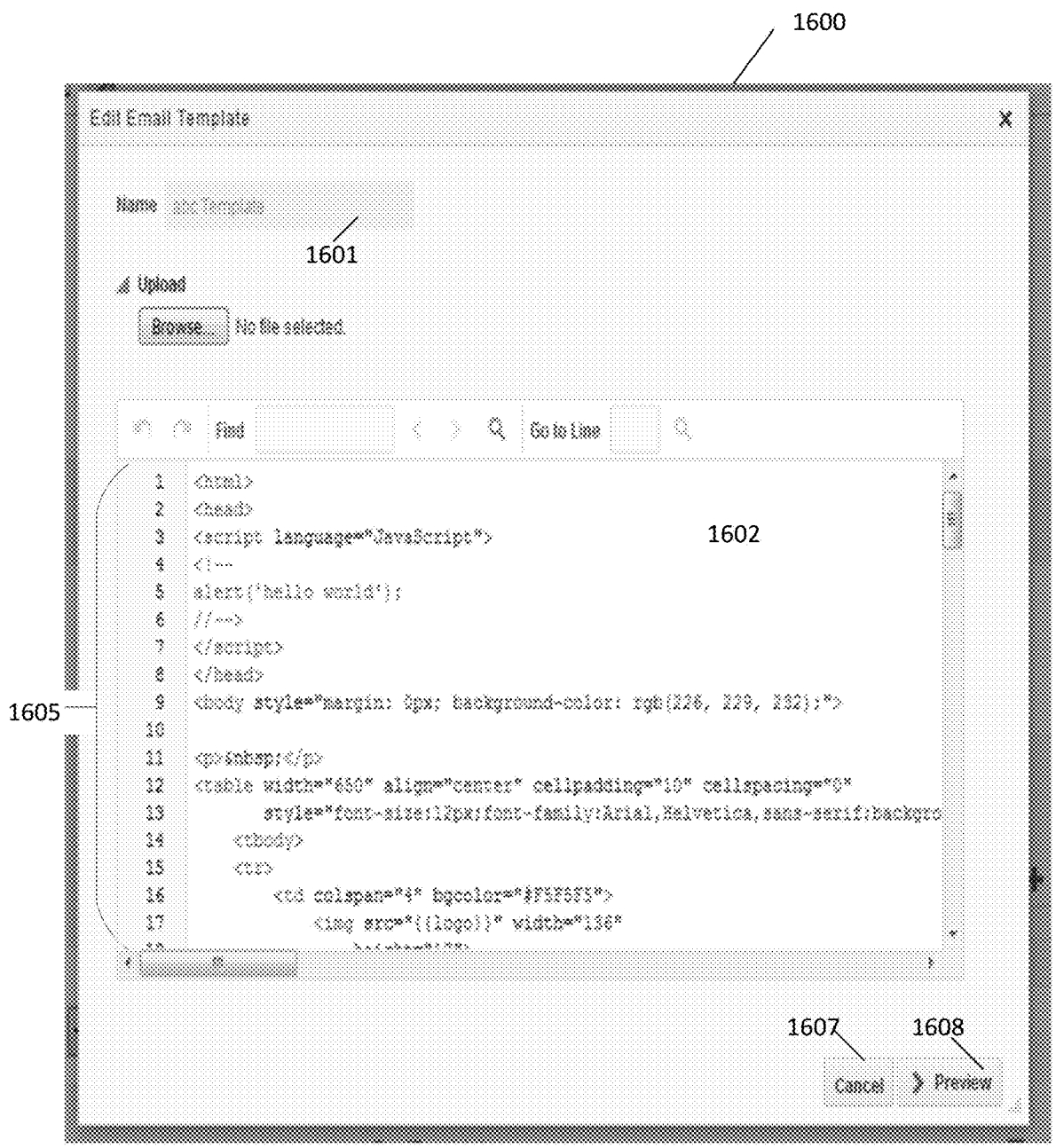
FIG. 16 depicts a block diagram of an edit email template page, according to one embodiment.

FIG. 16 depicts a block diagram of an edit email template page 1600, according to one embodiment. When editing a template 1605 displayed in the area 1602 of the code editor, the same two-step process, as discussed herein, is used as when creating a new template. Computer executable instructions of a template 1605 are displayed in area 1602. The instructions can be edited in the area 1602. The code editor control is used for editing the instructions. When an email template is edited, the field 1601 for entering a template's name is disabled. The template's name, according to one embodiment, is greyed in the field 1601. The dialog 1600 provides a cancel button 1607 and a preview button 1608.

Figure 17:
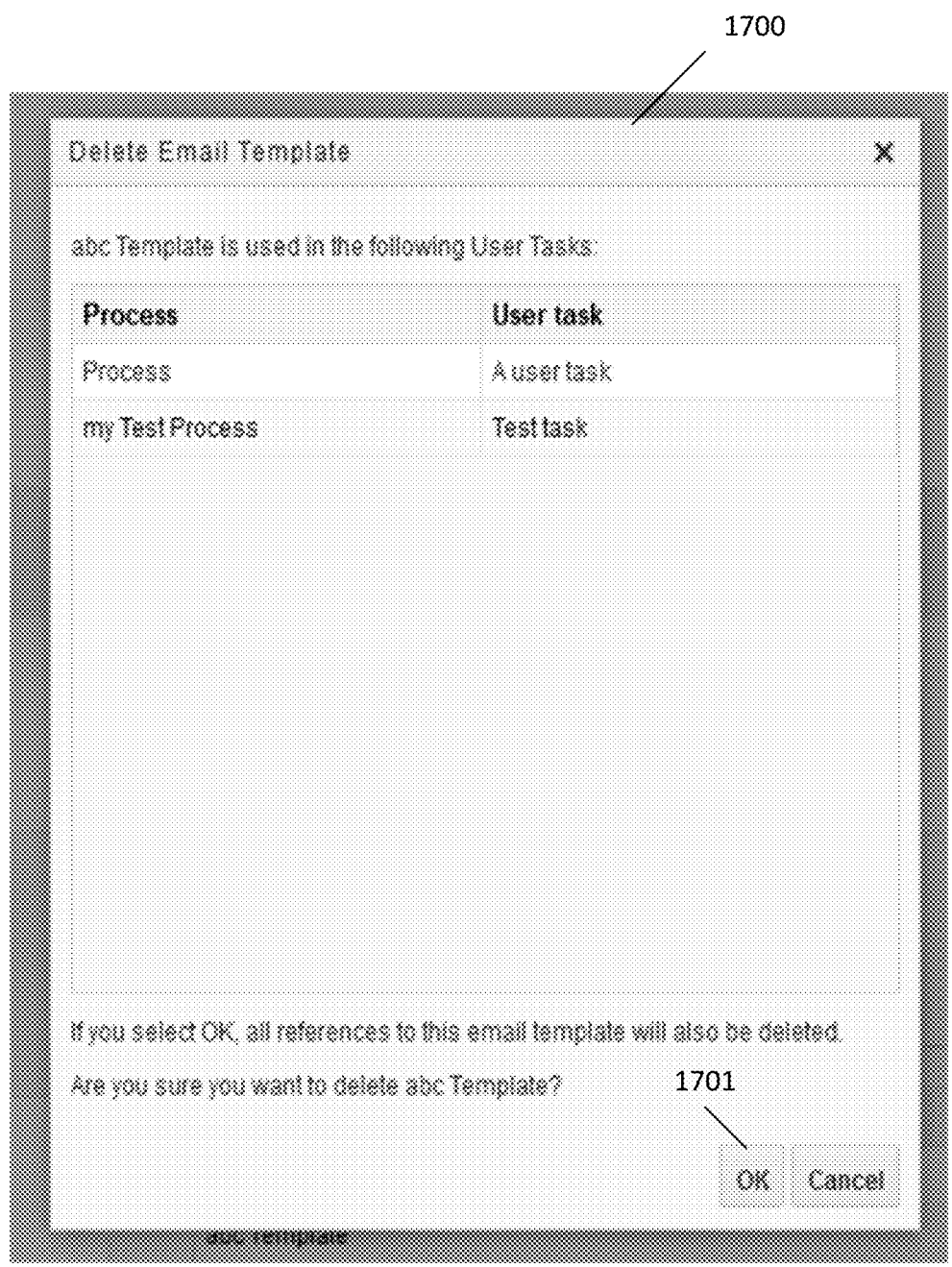
FIG. 17 depicts a delete email template notification, according to one embodiment.

FIG. 17 depicts a delete email template notification 1700, according to one embodiment. When a template is being deleted, the delete email template notification 1700 can be used to warn the user if the template is currently being used somewhere else in the application. The delete email template 1700 includes the name of the task, information describing the task and corresponding processes for the template that can be deleted. If the user selects the OK button 1701 to delete the template, the references to the template in the listed user tasks will also be deleted. If the user selects the cancel button 1702, the delete is cancelled.

Illustration of a Method

Figure 18:
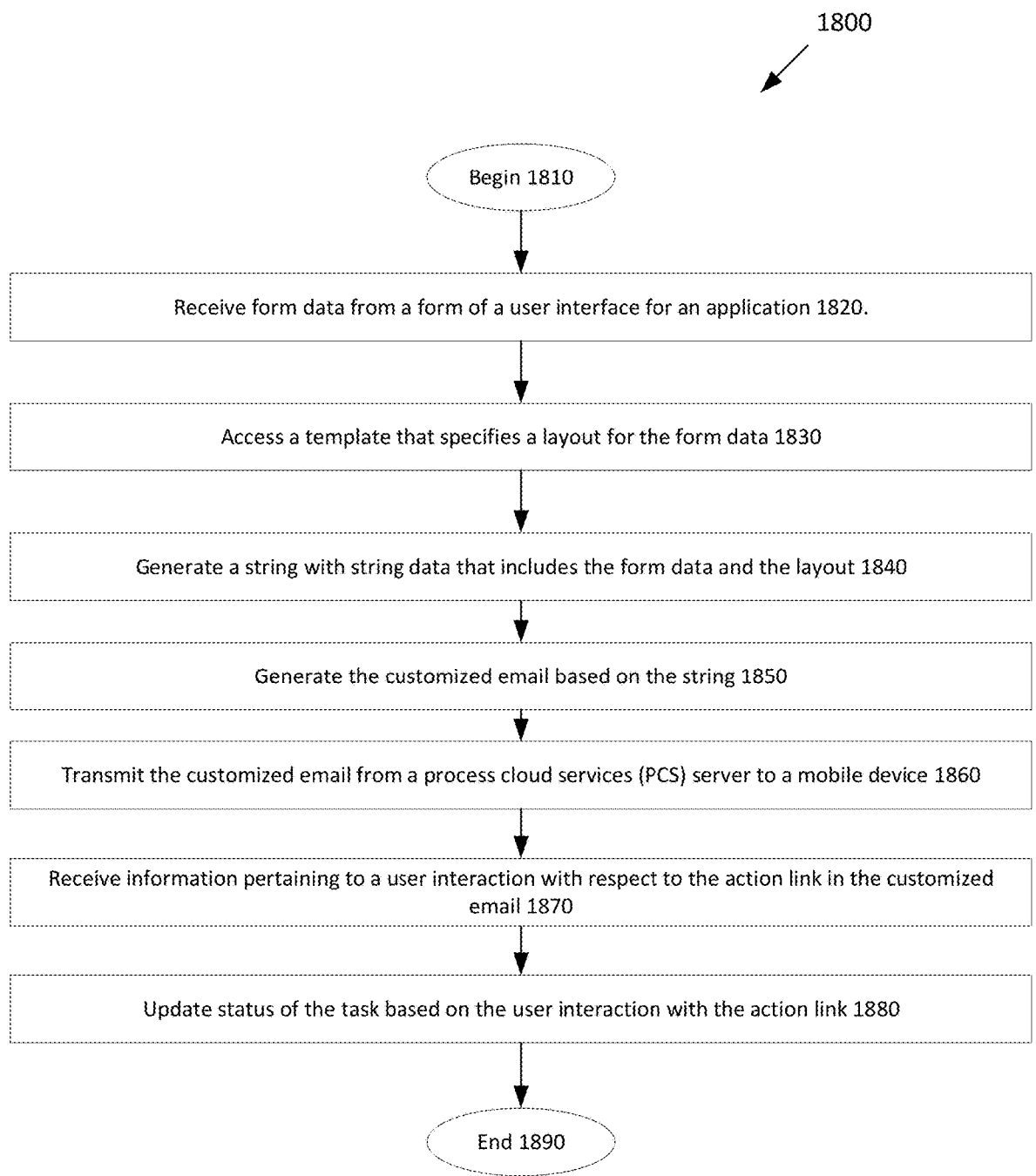
FIG. 18 depicts a flowchart of a method for creating a customized email for human tasks, according to one embodiment.

FIG. 18 depicts a flowchart 1800 of a method for creating a customized email for human tasks, according to one embodiment.

Users want to be able to work on tasks without being tied to a stationary computing device 110A (FIG. 1A). To do this, a customized email 193 (FIGS. 1B and 7) is generated that may be similar to a desk top form for working on the task. The customized email 193 (FIGS. 1B and 7) is transmitted to a mobile client device 130B (FIG. 1B).

Assume that the PCS server 140B (FIG. 1B) provides form 200 (FIG. 2) to application 11B (FIG. 1B)'s user interface 112B (FIG. 1B) on the client workspace computer 110B (FIG. 1B). The user interface 112B displays the form 200. A user enters form data 210-260 (FIG. 2) into the form 200 (FIG. 2). A message's payload 194 (FIGS. 1B and 7) is created, at the client workspace computer 110B's user interface 112B (FIG. 1B). The payload 194 includes the form data. The payload 194 is received by an engine 710 (FIG. 7).

At 1810, the method begins.

At 1820, receive form data from a form of a user interface for an application, wherein the form data pertains to a task and the form data includes an action to perform with respect to the task. For example, an embodiments provides for receiving form data 210-260 (FIG. 2) from a form 200 (FIG. 2) of a user interface 112B (FIG. 1B) for an application 111B (FIG. 1B), wherein the form data pertains to a task 192 (FIGS. 1B and 7) and the form data includes an action 210B (FIG. 2) to perform with respect to the task.

The payload 194 is received by an engine 710 (FIG. 7) of the PCS system 150 (FIGS. 1B and 7). The payload 194 (FIGS. 1B and 7) includes form data 210-260 (FIG. 2) from a form 200 (FIG. 2) entered at a user interface 112B (FIG. 1B) at a client workspace computer 110B (FIG. 1B), according to one embodiment. The client workspace computer 110B (FIG. 1B) may be a relatively stationary computer that is not easy to move around, such as a desk top. Examples of an action are actions that would be performed, for example, as a result of a control 210 (FIG. 2) being selected by a user. The form data has at least one action that will be represented in the customized email 193 (FIGS. 1B and 7). In this illustration, assume that the action is an approve button 210A (FIG. 2). The form data can also include labels and data entry fields, among other things. The displayed information and the data that would be entered into the form's data entry fields pertain to furthering the status 141B (FIG. 1B) of the task 192 (FIGS. 1B and 7) toward completion.

At 1830, access a template that specifies a layout for the form data. For example, an embodiment provides for accessing a template 191 (FIGS. 1B and 7) that specifies a layout for the form data.

The engine 710 (FIG. 7) creates a task 192 (FIGS. 1B and 7) based on user specified input from a notification panel 800 (FIG. 8), 1100 (FIG. 11). The user specified input specifies, for example, what template 191 (FIG. 1B, FIG. 7) to use, whether to stop notifications, such as a customized email 400 (FIG. 4), 193 (FIGS. 1B and 7), and any document(s) to attach to the customized email 400 (FIG. 4), 193 (FIGS. 1B and 7).

The template is parsed. For example, a mustache parser can parse the template to remove static tokens from it. The mustache parser is located in the mustache.java 750, according to one embodiment.

Referring to FIGS. 1B, 2 and 7, the logic 780 maps the form data in the payload 194 to variables in the template 191. Examples of templates include mustache and jade. The template includes an HTML file, according to one embodiment. Although various embodiments refer to a mustache or jade template, embodiments are well suited to other types of templates. The template 191 provides a layout for generating the customized email 193. For example, the layout can specify which of the form data 210-260 will be included in the customized email 193, positioning of the form data 210-260 in the customized email and the font size of the form data 210-260. The layout can also specify the positioning and font size of other information besides the form data, such as additional text and/or labels.

The template 191 (FIGS. 1B and 7) can be an existing template or a new user created template. For example, an existing template can be uploaded using the upload template page 19a (FIG. 6) or a new template can be created using the create template page 19b (FIG. 6), 900 (FIG. 9), as discussed herein. The existing template can be a default template. A user can use an edit email template page 1600 (FIG. 16) modify an existing template to create a new template. The user can create a new template from scratch or customize an existing template using a code editor that is used on conjunction with FIGS. 9 and 16.

A template can be automatically generated. For example, a template could be automatically generated based on the form 200 (FIG. 2), 300 (FIG. 3). The form 200, 300 (FIGS. 2, 3) is provided by the PCS server 140B (FIG. 1B). The PCS server 140B could generate the template based on the form that it receives. The template could also be automatically modified using user configured filters. For example, a user could configure filters that specify what form data to include in the customized email and to specify formatting information so that the customized email will fit on the display of a particular type of mobile client device 130B (FIG. 1B).

At 1840, generate a string with string data that includes the form data and the layout, wherein the string data describes itself. For example, an embodiment provides for generating a string 160 (FIGS. 1B and 7) with string data that includes the form data and the layout, wherein the string data describes itself. According to one embodiment, the string 160 includes all of the information that is used in generating the customized email. For example, the parsed string 160 includes the form data 210-260 (FIG. 2) that were selected based on the template 191 and information specifying positioning of the form data 210-260 in the customized email and the font style and size of the form data 210-260. The string 160 can also specify additional information besides the form data, such as additional text and/or labels as well as information specifying the positioning and font size of that additional information.

Referring to FIGS. 1B and 7, the mustache.java 750 generates a parsed string 160 based on the form data from the payload 194 and the template 191.

The parsed string 160 (FIGS. 1B and 7) has self-describing data. For example, the string 160 can contain information that bytes 1-3 are for a first field of the form, bytes 4-8 are for a second field of the form, and so on.

At 1850, generate the customized email based on the string, wherein the customized email includes an action link that corresponds with the form's action to perform with respect to the task. For example, an embodiment provides for generating the customized email 400 (FIG. 4), 193 (FIGS. 1B and 7) based on the string 160 (FIGS. 1B and 7), wherein the customized email (400 (FIG. 4), 193 (FIGS. 1B and 7) includes an action link 401 (FIG. 4) that corresponds with the form's action 210B (FIG. 2) to perform with respect to the task 192 (FIGS. 1B and 7). The generated email, according to one embodiment, has similar information and/or a similar appearance to the form.

At 1860, transmit the customized email from a process cloud services (PCS) server to a mobile client device. For example, an embodiment provides for transmitting the customized email 400 (FIG. 4), 193 (FIGS. 1B and 7) from a process cloud services (PCS) server 140B (FIG. 1B) to a mobile client device 130B (FIG. 1B). Send email 730 (FIG. 7) transmits the customized email 400 (FIG. 4), 193 (FIGS. 1B and 7) from the application 111B (FIG. 1B) on the client workspace computer 110B (FIG. 1B) to the mobile client device 130B (FIG. 1B).

The mobile client device 130B's user can view the information displayed on the customized email 400 (FIG. 4), 193 (FIGS. 1B and 7), can enter data into data entry fields of the customized email, can attach documents to the customized email, and can interact with the action link 401 (FIG. 4) of the customized email. Any interactions a user has with the customized email 400 (FIG. 4), 193 (FIGS. 1B and 7) can be used to change the status of the task. For example, the data that is entered into the customized email's data entry fields, any attached documents, the interaction with the action link 401 (FIG. 4), and so on pertain to change the status of the task 192 (FIGS. 1B and 7) toward completion.

The data entered into the customized email, any documents attached to the customized email, as well as any user interaction with respect to the action link 401 (FIG. 4) are transmitted to PCS server 140B (FIG. 1B).

At 1870, receive, at the process cloud services (PCS) server, information pertaining to a user interaction with respect to the action link in the customized email, wherein the user interaction was performed at the mobile client device. For example, embodiments provides for receiving, at the process cloud services (PCS) server 140B (FIG. 1B), information pertaining to a user interaction with respect to the action link 401 (FIG. 4) in the customized email, wherein the user interaction was performed at the mobile client device 130B (FIG. 1B).

The data that was entered into the customized email 400 (FIG. 4), 193 (FIGS. 1B and 7)'s data entry fields, any documents attached to the customized email, as well as any user interactions with respect to the action link(s) and so on are received by the PCS server 140B (FIG. 1B). According to one embodiment, the data entered into the form 200 (FIG. 2) is displayed as text in the customized email.

At 1880, update status of the task based on the user interaction with the action link. For example, an embodiment provides for updating status 141B (FIG. 1B) of the task based on the user interaction with the information received in 1870 (FIG. 18). The PCS server 140B uses the received information to update the status 141B (FIG. 1B) of the task 192 (FIGS. 1B and 7). For example, the status may be updated to indicate that anything for the task has been changed or completed, or that additional information or actions are to be performed in order to change or advance the task's status.

At 1890, the method ends.

An embodiment provides for wherein the form and form data fit on a display screen of a substantially stationary client workspace computer and wherein the tangible processor-readable storage device further includes instructions executable by the one or more processors for: reformatting the form data to fit a display screen of the mobile client device. For example, the layout can reformat the form data to the display screen of the mobile client device by specifying which of the form data will be included in the customized email, positioning of the form data in the customized email, and specifying font size and font style of the form data. The layout can filter out some of the form data so there is less form data to be displayed on the mobile client device. Filtering can be used to identify a subset of the form data received in the payload is used to create the customized email. The form data can be positioned differently in the customized email than in the form. The form data can be made smaller by changing the font size and/or font style. The form data can be made easier to read on a mobile client device, despite being smaller, for example, by changing the font style. For example, a smaller font size could be used while changing the font style of at least some of the form data to bold.

According to one embodiment, the email is generated during run time. For example, the email is generated in response to data being entered into a form associated with performing a human task. More specifically, continuing the example of new hire process, the email is generated when the new process is created for hiring an employee.

Various embodiments provide for generating a string based on the form data and the template; and generating the customized email based on string.

An embodiment provides for generating the action link based on the information describing an action to be taken with respect to the task.

An embodiment provides for wherein the template is selected from a mustache template and a jade template.

An embodiment provides for wherein the template includes a Hypertext Markup Language (HTML) file.

An embodiment provides for wherein the customized email is an HTML file.

An embodiment provides for wherein the mobile client device provides the information pertaining to the user interaction with respect to the action link in the customized email without a web session with the application 111B (FIG. 1B).

An embodiment provides for using the action link to perform an action on the task without logging into the application. For example, referring to FIG. 1B, the action can be performed on the mobile client device 130B without logging into the application 111B of the client workspace computer 110B.

An embodiment provides wherein the layout specify which of the form data will be included in the customized email, positioning of the form data in the customized email, font size and font style of the form data. For example, the template specifies which of the form data 210-260 will be included in the customized email 193, positioning of the form data 210-260 in the customized email, font size and font style of the form data 210-260.

An embodiment provides for providing forms from a first electronic device to a second electronic device; receiving the form data on the second electronic computer; and using the action link to perform the action on the task on a third electronic computer device 130B that receives the customized email, wherein the first, second and third electronic computers are remote with respect to each other. For example, an embodiment provides for providing forms from a first electronic device 140B (FIG. 1B) to a second electronic device 110B (FIG. 1B); receiving the form data on the second electronic computer; and using the action link to perform the action on the task on a third electronic computer device 130B (FIG. 1B) that receives the customized email, wherein the first, second and third electronic computers are remote with respect to each other.

An embodiment provides for uploading the template with an upload template page. An embodiment provides for uploading the template with the upload template page, wherein the template is selected from a group consisting of a pre-existing template that was previous created by a user and a default template that was not created by a user.

According to one embodiment the accessing of the template further comprises: creating a new template based on information that a user enters into a create template page.

According to one embodiment, the generating of the customized email further comprises: generating the customized email during run time.

An embodiment provides for providing security by associating a unique identifier with the task for the action of the form for a particular user; receiving a response from the mobile device back to the PCS server with the unique identifier, wherein the identifier uniquely identifies a unique combination of the task, the action and the user. For example, a unique identifier (ID) is associated with a particular instance of a task 192 (FIG. 7) for a particular action of a form for a particular user. When the user selects an action link on an email 193 (FIG. 7) that corresponds with the particular action from that same form, a response is transmitted from the mobile device 130B (FIG. 1B) back to the PCS server 140B (FIG. 1B) with the unique ID.

Unless otherwise specified, any one or more of the embodiments described herein can be implemented using processor readable instructions which reside, for example, in tangible processor-readable storage device of a computer system or like device. The tangible processor-readable storage device can be any kind of physical memory that instructions can be stored on. Examples of the tangible processor-readable storage device include but are not limited to a disk, a compact disk (CD), a digital versatile device (DVD), read only memory (ROM), flash, and so on. As described above, certain processes and operations of various embodiments of the present invention are realized, in one embodiment, as a series of processor readable instructions (e.g., software program) that reside within tangible processor-readable storage device of a computer system and are executed by one or more processors of the computer system. When executed, the instructions cause a computer system to implement the functionality of various embodiments of the present invention. For example, the instructions can be executed by a processor, such as a central processing unit, associated with the computer system. The tangible processor-readable storage device is hardware memory and the one or more processors are hardware processors.

Figure 19:
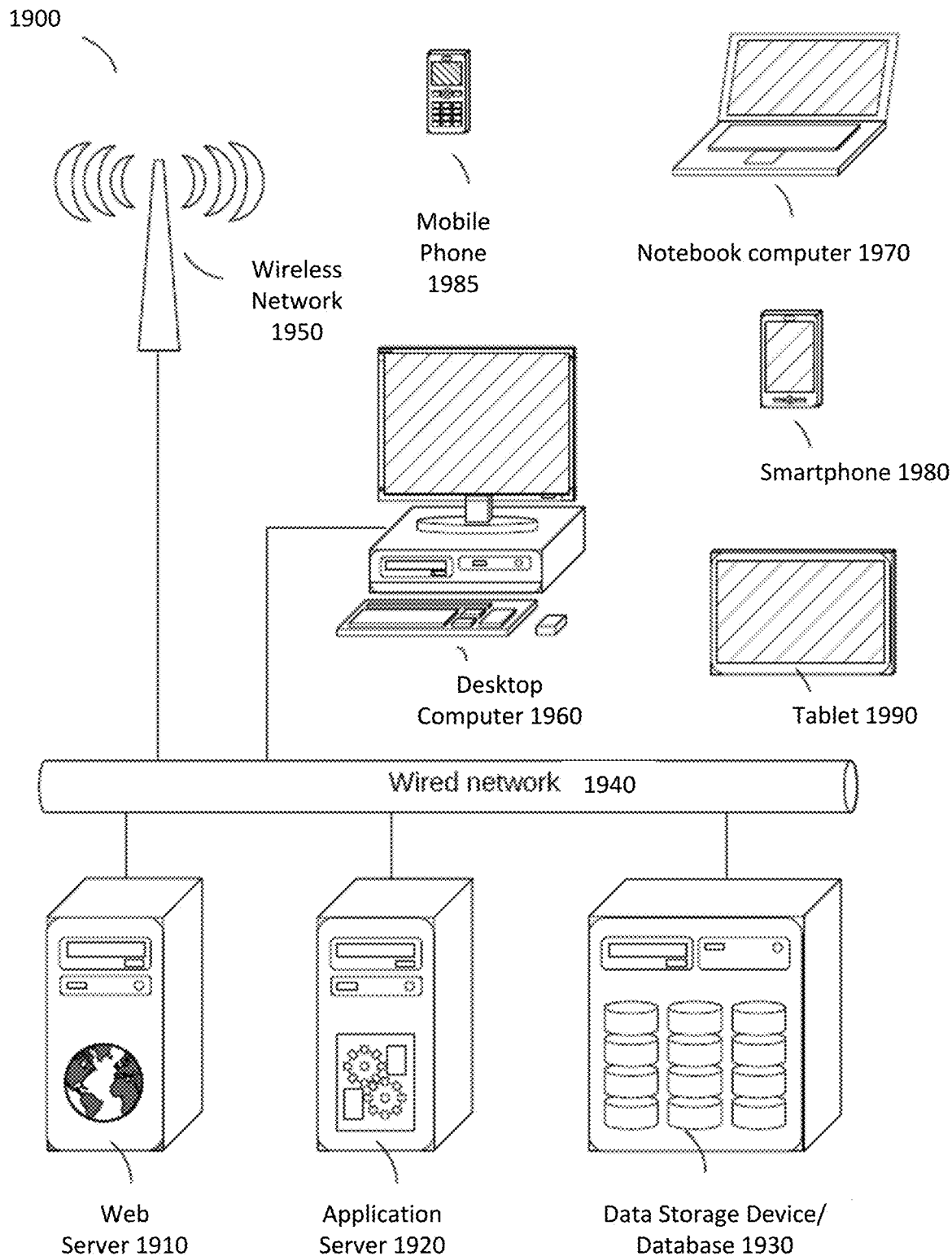
FIG. 19 is a general block diagram of a system and accompanying computing environment usable to implement the embodiments of FIGS. 1-18.

Various embodiments provide for a tangible processor-readable storage device including instructions for creating a customized email for a task, wherein the tangible processor-readable storage device includes instructions executable by one or more processors for: receiving form data from a form of a user interface for an application, wherein the form data pertains to a task and the form data includes an action to perform with respect to the task; accessing a template that specifies a layout for the form data; generating a string with string data that includes the form data and the layout, wherein the string data describes itself; generating the customized email based on the string, wherein the customized email includes an action link that corresponds with the form's action to perform with respect to the task; transmitting the customized email from a process cloud services (PCS) server to a mobile client device; receiving, at the PCS server, information pertaining to a user interaction with respect to the action link in the customized email, wherein the user interaction was performed at the mobile client device; and updating status of the task based on the user interaction with the action link Various embodiments provide for an apparatus comprising: one or more processors; and a tangible processor-readable storage device including instructions for: receiving form data from a form of a user interface for an application, wherein the form data pertains to a task and the form data includes an action to perform with respect to the task; accessing a template that specifies a layout for the form data; generating a string with string data that includes the form data and the layout, wherein the string data describes itself; generating a customized email based on the string, wherein the customized email includes an action link that corresponds with the form's action to perform with respect to the task; transmitting the customized email from a process cloud services (PCS) server to a mobile client device; receiving, at the PCS server, information pertaining to a user interaction with respect to the action link in the customized email, wherein the user interaction was performed at the mobile client device; and updating status of the task based on the user interaction with the action link Exemplary System and Computer Environment FIG. 19 is a general block diagram of a system 1900 and accompanying computing environment usable to implement the embodiments of FIGS. 1-18. The example system 1900 is capable of supporting or running various hardware and/or software modules and associated methods discussed with reference to FIGS. 1-18. Note that certain embodiments may be implemented using one or more standalone applications (for example, residing in a user device) and/or one or more web-based applications implemented using a combination of client-side and server-side code.

The general system 1900 includes user devices 1960-1990, including desktop computers 1960, notebook computers 1970, smartphones 1980, mobile phones 1985, and tablets 1990. The general system 1900 can interface with any type of user device, such as a thin-client computer, Internet-enabled mobile telephone, mobile Internet access device, tablet, electronic book, or personal digital assistant, capable of displaying and navigating web pages or other types of electronic documents and UIs, and/or executing applications. Although the system 1900 is shown with five user devices, any number of user devices can be supported.

A web server 1910 is used to process requests from web browsers and standalone applications for web pages, electronic documents, enterprise data or other content, and other data from the user computers. The web server 1910 may also provide push data or syndicated content, such as RSS feeds, of data related to enterprise operations.

An application server 1920 operates one or more applications. The applications can be implemented as one or more scripts or programs written in any programming language, such as Java, C, C++, C#, or any scripting language, such as JavaScript or ECMAScript (European Computer Manufacturers Association Script), Perl, PHP (Hypertext Preprocessor), Python, Ruby, or TCL (Tool Command Language).

Applications can be built using libraries or application frameworks, such as Rails, Enterprise JavaBeans, or .NET. Web content can created using HTML (HyperText Markup Language), CSS (Cascading Style Sheets), and other web technology, including templating languages and parsers.

The data applications running on the application server 1920 are adapted to process input data and user computer requests and can store or retrieve data from data storage device or database 1930. Database 1930 stores data created and used by the data applications. Data structures 191-194, 196, 141B can be stored in a database 1930. In an embodiment, the database 1930 includes a relational database that is adapted to store, update, and retrieve data in response to SQL format commands or other database query languages. Other embodiments may use unstructured data storage architectures and NoSQL (Not Only SQL) databases.

In an embodiment, the application server 1920 includes one or more general-purpose computers capable of executing programs or scripts. In an embodiment, web server 1910 is implemented as an application running on the one or more general-purpose computers. The web server 1910 and application server 1920 may be combined and executed on the same computers.

An electronic communication network 1940-1950 enables communication between user computers 1960-1990, web server 1910, application server 1920, and database 1930. In an embodiment, networks 1940-1950 may further include any form of electrical or optical communication devices, including wired network 1940 and wireless network 1950. Networks 1940-1950 may also incorporate one or more local-area networks, such as an Ethernet network, wide-area networks, such as the Internet; cellular carrier data networks; and virtual networks, such as a virtual private network.

The system 1900 is one example for executing applications according to an embodiment of the invention. In another embodiment, web server 1910, application server 1920, and optionally database 1930 can be combined into a single server computer application and system. In a further embodiment, virtualization and virtual machine applications may be used to implement one or more of the web server 1910, application server 1920, and database 1930.

In still further embodiments, all or a portion of the web and application serving functions may be integrated into an application running on each of the user computers. For example, a JavaScript application on the user computer may be used to retrieve or analyze data and display portions of the applications.

With reference to FIG. 1B to FIG. 17, and FIG. 19, the systems 100B, 150, may be implemented in whole or in part via one or more of the desktop computer 1960, notebook computer 1970, smartphone 1980, mobile phone 1985, tablet 1990, of FIG. 19 and/or other computing devices. In a particular example embodiment, the computing devices 1960-1990 run browsers, e.g., used to display the user interfaces 112B, 200, 300, 400, 500, 600, 800-1700.

In a particular example embodiment, the client workspace computer 110B can be implemented on a desktop computer 1960 and/or a notebook computer 1970; the network 120B can be implemented as a network 1940 and/or a network 1950. The mobile client device 130B can be implemented as a mobile phone 1985, a smart phone 1980, and/or a tablet 1990. A system 150 (FIGS. 1B and 7) can be implemented as a server 1910 and/or a server 1920. The PCS server 140B can be implemented as a server 1910 and/or a server 1920. The user interfaces 200, 300, 600 can be displayed and accessed on desktop 1960 or a notebook computer 1970 using browsers that connect with the Internet, represented by the wired network 1940 and/or wireless network 1950, to access one or more network-coupled servers, databases, and/or associated cloud-based functionality. Further, the user interfaces 400 and 500 can be displayed and accessed on a mobile phone 1985, a smart phone 1980, and/or a tablet 1990 in a similar manner using browsers that connect with the Internet to access one or more network-coupled servers, databases, and/or associated cloud-based functionality. Note that one or more of the web server 1910, application server 1920, and data storage device or database 1930 shown in FIG. 19 may be used to host software corresponding to system 150 of FIG. 7, as detailed more fully below. According to one embodiment, user interfaces 112B, 200, 300, 400, 500, 600, 800-1700 are web pages provided by server 1910 and/or server 1920 that the client computer devices display and access with their respective browsers.

The cloud computing environment, as depicted in FIG. 19, may include a collection of plural web servers 1910, application servers 1920, and data storage devices 1930.

The user interfaces, as discussed herein, include accompanying UI controls and associated options. Example options include buttons, data entry fields, drop down menus, radio buttons, check boxes and so on, as discussed herein.

Figure 20:
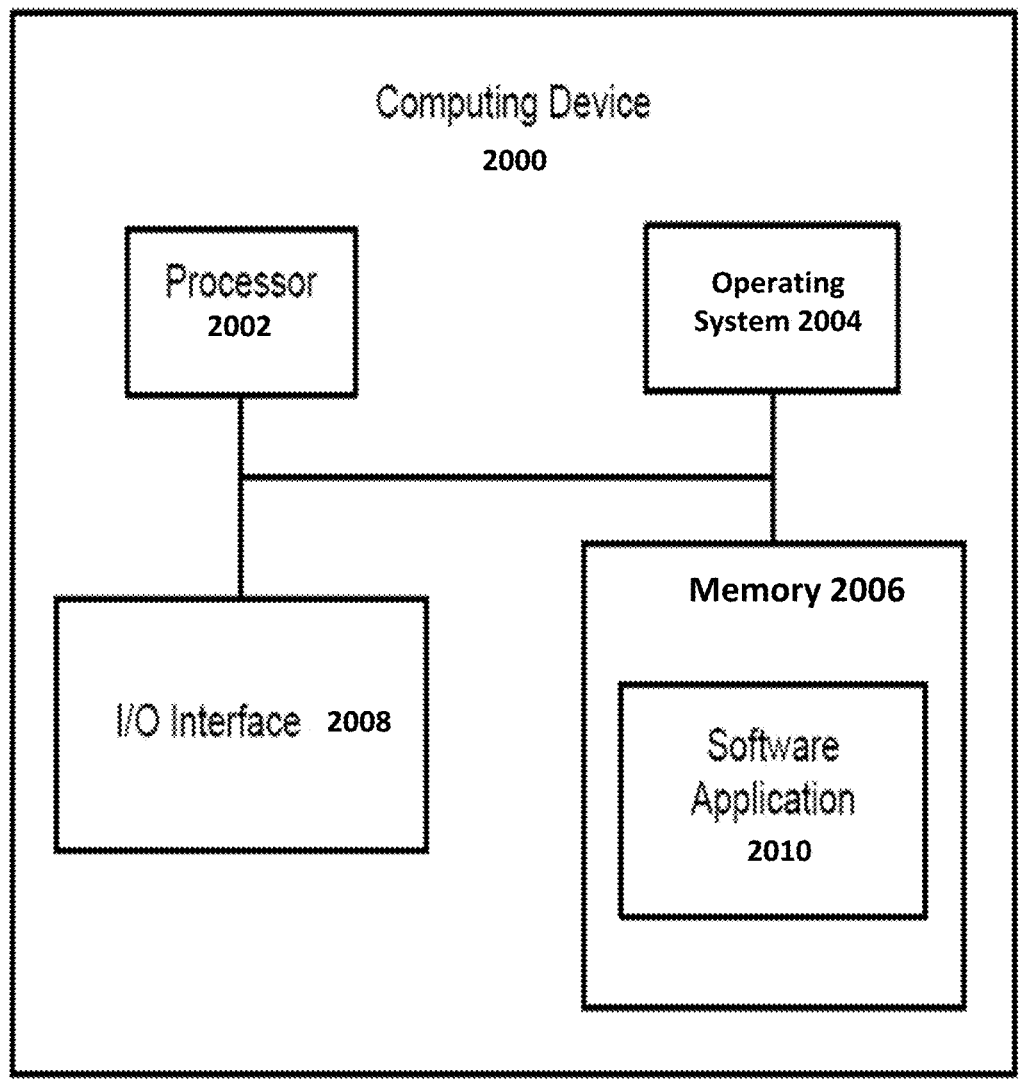
FIG. 20 is a general block diagram of a computing device usable to implement the embodiments of FIGS. 1-18.

FIG. 20 is a general block diagram of a computing device 2000 usable to implement the embodiments described herein. While the computing device 2000 of FIG. 20 may be described as performing one or more of the steps in the embodiments herein, in other embodiments any suitable component or combination of components of the computing device 2000 or any suitable processor or processors associated with system 2000 may facilitate performing the steps.

FIG. 20 illustrates a block diagram of an example computing system 2000, which may be used for implementations described herein. For example, computing system 2000 may be used to implement 1985, 1970, 1980, 1960, 1990, 1910, and 1920 of FIG. 19 as well as to perform the method implementations described herein. In some implementations, computing system 2000 may include a processor 2002, an operating system 2004, a memory 2006, and an input/output (I/O) interface 2008. In various implementations, processor 2002 may be used to implement various functions and features described herein, as well as to perform the method implementations described herein. While processor 2002 is described as performing implementations described herein, any suitable component or combination of components of system 2000 or any suitable processor or processors associated with system 2000 or any suitable system may perform the steps described. Implementations described herein may be carried out on a user device, on a server, or a combination of both.

Computing device 2000 also includes a software application 2010, which may be stored on memory 2006 or on any other suitable storage location or computer-readable medium. Software application 2010 provides instructions that enable processor 2002 to perform the functions described herein and other functions. The components of computing system 2000 may be implemented by one or more processors or any combination of hardware devices, as well as any combination of hardware, software, firmware, etc.

For ease of illustration, FIG. 20 shows one block for each of processor 2002, operating system 2004, memory 2006, I/O interface 2008, and software application 2010. These blocks 2002, 2004, 2006, 2008, and 2010 may represent multiple processors, operating systems, memories, I/O interfaces, and software applications. In various implementations, computing system 2000 may not have all of the components shown and/or may have other elements including other types of components instead of, or in addition to, those shown herein.

CONCLUSION

Although the description has been described with respect to particular embodiments thereof, these particular embodiments are merely illustrative, and not restrictive. Various embodiments are well suited for other types of messages besides emails, such as short message services (SMS), text. Various embodiments are well suited for various types of templates, tasks and forms. Various embodiments are well suited for transmitting the string 160 from the PCS server 140B (FIG. 1B) to an end user's computer, such as a mobile device 130B or non-mobile type computing device 110B, and generating the email based on the string 160 at the second computer. Service Now and Sales Force are other examples of cloud services.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

Various embodiments can be provided with logic encoded in one or more tangible media for execution by one or more hardware processors operable to perform the various embodiments described herein.

We claim:

1. A tangible processor-readable storage device including instructions for using data structures, such as templates, to create a customized email for tasks, wherein the tangible processor-readable storage device includes instructions executable by one or more processors for:
receiving form data from a form of a user interface for an application, wherein the form data pertains to a task and the form data includes an action to perform with respect to the task;
generating an action link based on information describing the action, from the form data, to be taken with respect to the task;
accessing a template that specifies a layout for the form data;
generating a string with string data that includes the form data and the layout, wherein the string data describes itself;
generating the customized email based on the string, wherein the customized email includes the action link that corresponds with the form's action to perform with respect to the task;
transmitting the customized email from a process cloud services (PCS) server to a mobile client device;
receiving, at the PCS server, information pertaining to a user interaction with respect to the action link in the customized email, wherein the user interaction was performed at the mobile client device; and
updating status of the task based on the user interaction with the action link.

2. The tangible processor-readable storage device as recited by claim 1, wherein the layout specifies which of the form data will be included in the customized email, positioning of the form data in the customized email, font size and font style of the form data.

3. The tangible processor-readable storage device as recited by the claim 1, wherein the template is selected from a mustache template and a jade template.

4. The tangible processor-readable storage device as recited by claim 1, wherein the template includes a Hypertext Markup Language (HTML) file.

5. The tangible processor-readable storage device as recited by claim 1, wherein the mobile client device provides the information pertaining to the user interaction with respect to the action link in the customized email without a web session with the application.

6. The tangible processor-readable storage device as recited by claim 1, wherein the tangible processor-readable storage device further includes instructions executable by the one or more processors for:
using the action link to perform the action on the task without logging into the application.

7. The tangible processor-readable storage device as recited by claim 1, wherein the tangible processor-readable storage device further includes instructions executable by the one or more processors for:
providing forms from a first electronic device to a second electronic device; receiving the form data on the second electronic device; and using the action link to perform the action on the task on a third electronic device that receives the customized email, wherein the first, second and third electronic devices are remote with respect to each other.

8. The tangible processor-readable storage device as recited by claim 1, wherein the tangible processor-readable storage device further includes instructions executable by the one or more processors for:
uploading the template with an upload template page.

9. The tangible processor-readable storage device as recited by claim 8, wherein the uploading further comprises:
uploading the template with the upload template page, wherein the template is selected from a group consisting of a pre-existing template that was previous created by a user and a default template that was not created by a user.

10. A method for using data structures, such as templates, to create a customized email for tasks, the method providing;
receiving form data from a form of a user interface for an application, wherein the form data pertains to a task and the form data includes an action to perform with respect to the task;
generating an action link based on information describing the action, from the form data, to be taken with respect to the task;
accessing a template that specifies a layout for the form data;
generating a string with string data that includes the form data and the layout, wherein the string data describes itself;
generating the customized email based on the string, wherein the customized email includes the action link that corresponds with the form's action to perform with respect to the task;
transmitting the customized email from a process cloud services (PCS) server to a mobile client device;
receiving, at the PCS server, information pertaining to a user interaction with respect to the action link in the customized email, wherein the user interaction was performed at the mobile client device; and
updating status of the task based on the user interaction with the action link.

11. The method as recited by claim 10, wherein the layout specifies which of the form data will be included in the customized email, positioning of the form data in the customized email, font size and font style of the form data .

12. The method as recited by the claim 10, wherein the template is selected from a mustache template and a jade template.

13. The method as recited by claim 10, wherein the template includes an HTML file.

14. The method as recited by claim 10, wherein the mobile client device provides the information pertaining to the user interaction with respect to the action link in the customized email without a web session with the application.

15. The method as recited by claim 10, wherein the method further comprises:
   using the action link to perform the action on the task without logging into the application.

16. The method as recited by claim 10, wherein the method further comprises:
   providing forms from a first electronic device to a second electronic device; receiving the form data on the second electronic device; and using the action link to perform the action on the task on a third electronic device that receives the customized email, wherein the first, second and third electronic devices are remote with respect to each other.

17. The method as recited by claim 10, wherein the method further comprises:
   uploading the template with an upload template page, wherein the template is selected from a group consisting of a pre-existing template that was previous created by a user and a default template that was not created by a user.

18. An apparatus comprising:
one or more processors; and
a tangible processor-readable storage device including instructions for:
receiving form data from a form of a user interface for an application, wherein the form data pertains to a task and the form data includes an action to perform with respect to the task;
generating an action link based on information describing the action, from the form data, to be taken with respect to the task;
accessing a template that specifies a layout for the form data;
generating a string with string data that includes the form data and the layout, wherein the string data describes itself;
generating a customized email based on the string, wherein the customized email includes the action link that corresponds with the form's action to perform with respect to the task;
transmitting the customized email from a process cloud services (PCS) server to a mobile client device;
receiving, at the PCS server, information pertaining to a user interaction with respect to the action link in the customized email, wherein the user interaction was performed at the mobile client device; and
updating status of the task based on the user interaction with the action link.

\* \* \* \* \*

UNITED STATES PATENT AND TRADEMARK OFFICE
CERTIFICATE OF CORRECTION

Page 1 of 2

PATENT NO. : 10,650,093 B2
APPLICATION NO. : 15/482371
DATED : May 12, 2020
INVENTOR(S) : Ganta et al.

It is certified that error appears in the above-identified patent and that said Letters Patent is hereby corrected as shown below:

In the Specification

In Column 1, Line 10, delete "(ORACP0185P," and insert -- (ORACP0185P), --, therefor.

In Column 1, Line 12, delete "purposes" and insert -- purposes. --, therefor.

In Column 1, Line 16, delete "ref" and insert -- ref. --, therefor.

In Column 7, Line 26, delete "Pcs" and insert -- PCS --, therefor.

In Column 8, Line 6, delete "task" and insert -- task. --, therefor.

In Column 8, Line 26, delete "NID" and insert -- ID --, therefor.

In Column 10, Line 11, delete "11B," and insert -- 111B, --, therefor.

In Column 11, Line 66, delete "15601" and insert -- 1506 --, therefor.

In Column 12, Line 42, delete "11B" and insert -- 111B --, therefor.

In Column 14, Line 28, delete "(400" and insert -- 400 --, therefor.

In Column 17, Line 31, delete "link" and insert -- link. --, therefor.

In Column 17, Line 50, delete "link" and insert -- link. --, therefor.

In Column 18, Lines 21-25, delete "Applications can be built using libraries or application frameworks, such as Rails, Enterprise JavaBeans, or .NET. Web content can created using HTML (HyperText Markup Language), CSS (Cascading Style Sheets), and other web technology, including Signed and Sealed this
Twentieth Day of April, 2021

Drew Hirshfeld
*Performing the Functions and Duties of the*
*Under Secretary of Commerce for Intellectual Property and*
*Director of the United States Patent and Trademark Office* templating languages and parsers." and insert the same on Column 18, Line 20 as a continuation of the same paragraph.

In Column 18, Line 23, after "can" insert -- be --.

In the Claims

In Column 23, Line 4, in Claim 11, delete "data ." and insert -- data. --, therefor.